US009641865B2

(12) United States Patent
Ikai et al.

(10) Patent No.: US 9,641,865 B2
(45) Date of Patent: May 2, 2017

(54) METHOD FOR DECODING MOVING IMAGES

(71) Applicant: SHARP KABUSHIKI KAISHA, Sakai, Osaka (JP)

(72) Inventors: Tomohiro Ikai, Osaka (JP); Yukinobu Yasugi, Osaka (JP); Tomoko Aono, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 15/334,048

(22) Filed: Oct. 25, 2016

(65) Prior Publication Data
US 2017/0041636 A1 Feb. 9, 2017

Related U.S. Application Data

(63) Continuation of application No. 14/697,400, filed on Apr. 27, 2015, now Pat. No. 9,514,519, which is a (Continued)

(30) Foreign Application Priority Data

Dec. 18, 2009 (JP) ................................. 2009-288448

(51) Int. Cl.
*G06K 9/40* (2006.01)
*H04N 19/61* (2014.01)
(Continued)

(52) U.S. Cl.
CPC ........... *H04N 19/61* (2014.11); *H04N 19/117* (2014.11); *H04N 19/44* (2014.11)

(58) Field of Classification Search
CPC ........ H04N 19/52; H04N 19/17; H04N 19/80; H04N 19/61; H04N 19/196; H04N 19/117;
(Continued)

(56) References Cited

U.S. PATENT DOCUMENTS 6,240,135 B1 5/2001 Kim
8,606,026 B2 * 12/2013 Ueda ...................... H04N 19/52
382/236
(Continued)

FOREIGN PATENT DOCUMENTS

EP 2 061 233 A1 5/2009
JP 2007-143178 A 6/2007
(Continued)

OTHER PUBLICATIONS

Chujoh et al, "Block-based Adaptive Loop Filter", ITU-Telecommunications Standardization Sector VCEG-AI18, Jul. 16-18, 2008.
(Continued)

*Primary Examiner* — Ali Bayat
(74) *Attorney, Agent, or Firm* — Birch, Stewart, Kolasch & Birch, LLP

(57) ABSTRACT

An image filter (100) for calculating a pixel value of target pixel in an output image from a pixel value of each of a pixel or pixels belonging to a filter area in an input image by using a filter coefficient vector V, is configured to include a filter coefficient vector changing section (120) for changing the filter coefficient vector V according to at least either where the target area is in the input image, or where the target pixel is in the output image.

3 Claims, 9 Drawing Sheets

Related U.S. Application Data continuation of application No. 13/515,957, filed as application No. PCT/JP2010/070053 on Nov. 10, 2010, now abandoned.

(51) Int. Cl.
*H04N 19/117* (2014.01)
*H04N 19/44* (2014.01)

(58) Field of Classification Search
CPC ...... H04N 19/44; H04N 19/82; H04N 19/176; H04N 19/172; H04N 19/159; G06T 2207/20012; G06T 2207/20192; G06T 5/00; G06T 5/002; G06T 5/003; G06T 5/001; G06T 9/004; G06T 9/00
See application file for complete search history.

(56) References Cited

U.S. PATENT DOCUMENTS

| | | | |
|---|---|---|---|
| 9,357,234 B2* | 5/2016 | Esenlik | H04N 19/70 |
| 9,503,755 B2* | 11/2016 | Esenlik | H04N 19/70 |
| 2004/0062310 A1 | 4/2004 | Xue et al. | |
| 2004/0076237 A1 | 4/2004 | Kadono et al. | |
| 2004/0179743 A1 | 9/2004 | Shibata et al. | |
| 2005/0265452 A1 | 12/2005 | Miao et al. | |
| 2006/0007239 A1 | 1/2006 | Harrison | |
| 2006/0182356 A1 | 8/2006 | Lillevold | |
| 2006/0239360 A1 | 10/2006 | Kadono et al. | |
| 2007/0080975 A1 | 4/2007 | Yamashita et al. | |
| 2007/0092002 A1 | 4/2007 | Xue et al. | |
| 2007/0098066 A1 | 5/2007 | Xue et al. | |
| 2007/0104269 A1 | 5/2007 | Xue et al. | |
| 2008/0013840 A1 | 1/2008 | Kimura | |
| 2008/0049843 A1 | 2/2008 | Kadono et al. | |
| 2008/0056353 A1 | 3/2008 | Xue et al. | |
| 2008/0056602 A1 | 3/2008 | Xue et al. | |
| 2008/0056603 A1 | 3/2008 | Xue et al. | |
| 2008/0063084 A1 | 3/2008 | Xue et al. | |
| 2008/0068682 A1 | 3/2008 | Morikawa | |
| 2008/0069245 A1 | 3/2008 | Kadono et al. | |
| 2008/0101719 A1 | 5/2008 | Lim et al. | |
| 2008/0130761 A1 | 6/2008 | Kadono et al. | |
| 2008/0144722 A1 | 6/2008 | Park et al. | |
| 2008/0247467 A1 | 10/2008 | Rusanovskyy et al. | |
| 2009/0087116 A1 | 4/2009 | Watarai | |
| 2009/0257670 A1 | 10/2009 | Chiu et al. | |
| 2010/0014763 A1 | 1/2010 | Wittmann et al. | |
| 2010/0020205 A1* | 1/2010 | Ishida | G06T 5/008 348/241 |
| 2010/0021071 A1 | 1/2010 | Wittmann et al. | |
| 2010/0061642 A1 | 3/2010 | Kondo et al. | |
| 2010/0098345 A1 | 4/2010 | Andersson et al. | |
| 2010/0329335 A1 | 12/2010 | Yasuda et al. | |
| 2011/0019096 A1 | 1/2011 | Lee et al. | |
| 2011/0043668 A1 | 2/2011 | McKinnon et al. | |
| 2011/0069752 A1 | 3/2011 | Watanabe et al. | |
| 2011/0103488 A1 | 5/2011 | Xue et al. | |
| 2011/0206125 A1* | 8/2011 | Chien | H04N 19/52 375/240.16 |
| 2013/0156111 A1* | 6/2013 | Lee | H04N 19/0089 375/240.24 |

FOREIGN PATENT DOCUMENTS

| | | |
|---|---|---|
| JP | 2008-500775 A | 1/2008 |
| KR | 1999-024963 A | 4/1999 |
| KR | 10-2008-0056083 A | 6/2008 |
| WO | WO 03/047267 A1 | 6/2003 |
| WO | WO 2005/120063 A2 | 12/2005 |
| WO | WO 2007-111292 A1 | 10/2007 |

OTHER PUBLICATIONS

Chujoh et al.,"Improvement of Block-based Adaptive Loop Filter", ITU Telecommunications Standardization Sector VCEG-AJ13, Oct. 4, 2008.

Japanese Office Action mailed Jul. 30, 2013 for JP Application No. 2011-546040 with an English translation.

Sakae, Okubo, the revised third edition H.264/AVC textbook the first edition H.264/AVC Textbook, Japan, Impress R & D Co., Ltd. Masanobu ISERI, Jan. 1, 2009, the first edition p. 146, p. 148.

U.S. Office Action issued in U.S. Appl. No. 13/515,957 on Dec. 19, 2013.

U.S. Office Action issued in U.S. Appl. No. 13/515,957 on May 16, 2014.

U.S. Office Action issued in U.S. Appl. No. 13/515,957 on Nov. 6, 2014.

Watanabe et al., "In-loop filter using bock-based filter control for video coding", 16th IEEE International Conference, Image Processing (ICIP), Oct. 10, 2009, pp. 1013-1016.

Y-W Huang et al. "Adaptive Quadtree-based Multi-reference Loop Filter", ITU-Telecommunications Standardization Sector VCEG-AK24, Apr. 15-18, 2009.

Non-Final Office Action issued in U.S. Appl. No. 14/697,400 on Feb. 2, 2016 (7 pages).

Notice of Allowance issued in U.S. Appl. No. 14/697,400 on Aug. 3, 2016 (7 pages).

* cited by examiner

FIG. 6

(a) | w(1) | w(2) | w(3) | w(4) | w(5) | w(6) | w(7) | w(8) | w(9) | w(10) | a_skip |

(b) | v(1) | v(2) | v(3) | v(4) | v(5) | v(6) | v(7) | v(8) | v(9) | v(10) |
    | v'(4) | v'(5) | v'(6) |

(c) | v(1) | v(2) | v(3) | v(4) | v(5) | v(6) | v(7) | v(8) | v(9) | v(10) |
    | dv'(4) | dv'(5) | dv'(6) |

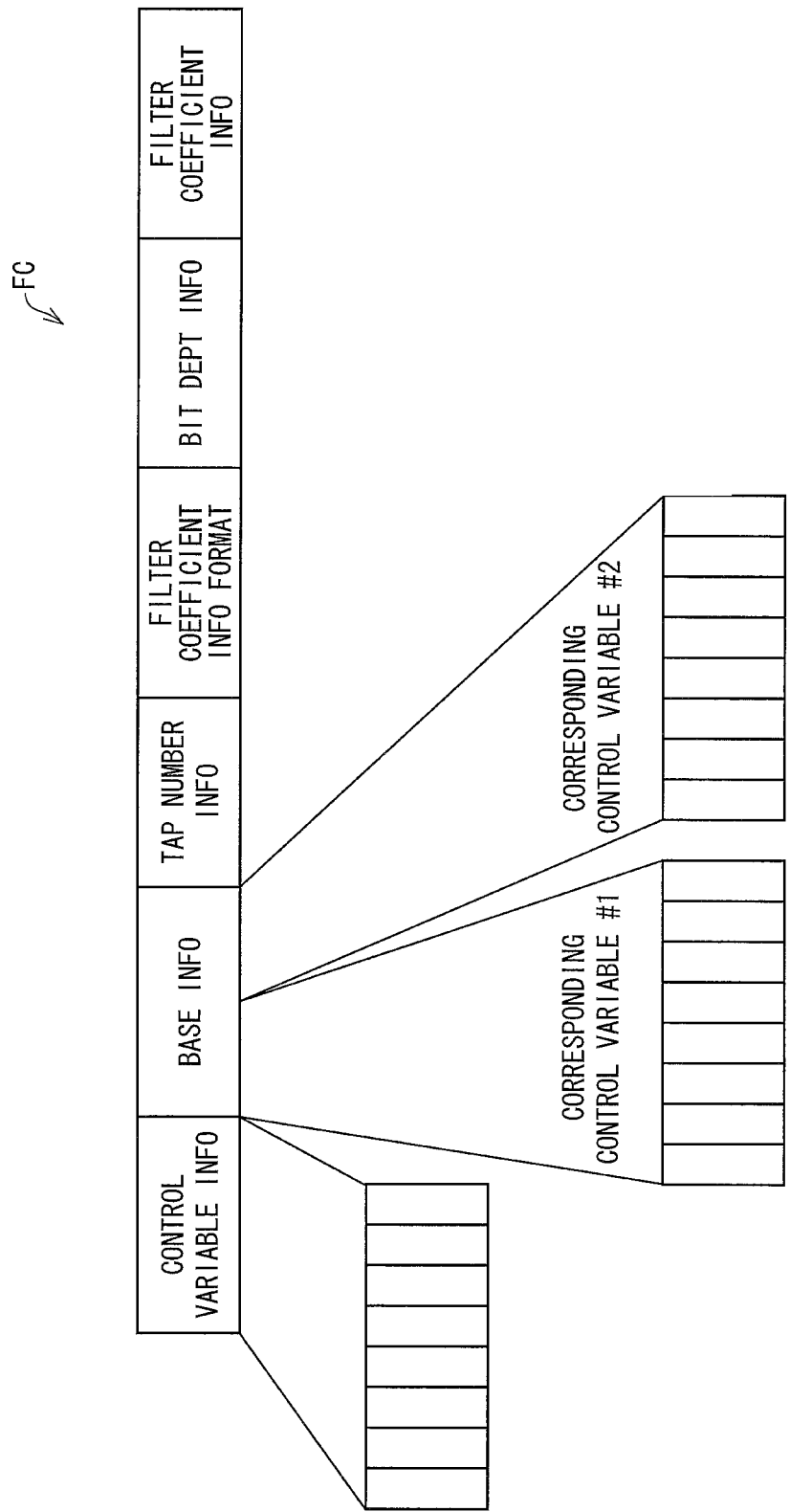

METHOD FOR DECODING MOVING IMAGES

This application is a Continuation of copending application Ser. No. 14/697,400, filed on Apr. 27, 2015, which is a Continuation of application Ser. No. 13/515,957, filed on Jun. 14, 2012 (now abandoned), which was filed as PCT International Application No. PCT/JP2010/070053 on Nov. 10, 2010, which claims the benefit under 35 U.S.C. §119(a) to Patent Application No. 2009-288448, filed in Japan on Dec. 18, 2009, all of which are hereby expressly incorporated by reference into the present application.

TECHNICAL FIELD

The present inventions relates to an image filter for filtering an image. Moreover, the present invention relates to an encoding device and a decoding device, each of which is provided with the image filter. Furthermore, the present invention relates to a data structure of an encoded data generated by the encoding device and referred to by the decoding device.

BACKGROUND ART

A moving image encoding device is used to efficiently transmit or record a moving image. As to moving image encoding techniques, H.264/MPEG-4 AVC and one adopted in KTA software may be exemplified as specific examples.

In such moving image encoding techniques, pictures constituting the moving image are managed in the form of a hierarchic structure constituted by slices (obtained by diving a picture), macro blocks (obtained by dividing a slice), and blocks (obtained by dividing the macro blocks). In general, a moving image is encoded on block basis.

Non-Patent Literature 1 discloses an ALF (Adaptive Loop Filter) for filtering a decoded image. ALF performs filtering in which slices in a decoded image are unit areas. For respective unit areas, filter coefficients to minimize an error between an original image and an ALF-treated decoded image are determined. The filtering of ALF is performed on unit area basis with the filter coefficients.

CITATION LIST

Non-Patent Literature

Non-Patent Literature 1
ITU-T Telecommunication Standardization Sector VCEG-AI18, 2008 (disclosed in July 2008)

SUMMARY OF INVENTION

Technical Problem

However, the filtering with ALF is performed with a invariable filter coefficient for each respective unit area. Thus, if a feature of the image is not uniform within a unit area, it is difficult to perform appropriate filtering by using ALF.

The present invention was accomplished in view of the aforementioned problem. An object of the present invention is to realize an image filter capable of performing more appropriate filtering even for a unit area whose feature is not uniform, by use of filter coefficients predetermined for respective unit areas.

Solution to Problem

In order to solve the aforementioned problem, an image filter according to the present invention is an image filter for calculating a pixel value of target pixel in an output image from a pixel value of each of a pixel or pixels belonging to a target area in an input image by using a filter coefficient vector, including: filter coefficient vector changing means for changing the filter coefficient vector according to at least either where the target area is in the input image, or where the target pixel is in the output image.

With this configuration, in which the filter coefficient vector changing means for changing the filter coefficient vector according to at least either where the target area is in the input image, or where the target pixel is in the output image is provided, it is possible to perform filtering more appropriately adaptive for every target area according to at least either where the target area is in the input image, or where the target pixel is in the output image.

Advantageous Effects of Invention

As described above, an image filter according to the present invention is an image filter for calculating a pixel value of target pixel in an output image from a pixel value of each of a pixel or pixels belonging to a target area in an input image by using a filter coefficient vector, including: filter coefficient vector changing means for changing the filter coefficient vector according to at least either where the target area is in the input image, or where the target pixel is in the output image. Therefore, it is possible to perform filtering more appropriately adaptive for every target area according to at least either where the target area is in the input image, or where the target pixel is in the output image.

BRIEF DESCRIPTION OF DRAWINGS

FIG. 6 is a view illustrating configurations of filter coefficient information to be outputted from the adaptive filter according the embodiment. (a) of FIG. 6 illustrates a first example of filter coefficient information. (b) of FIG. 6 illustrates a second example of filter coefficient information. (c) of FIG. 6 illustrates a third example of filter coefficient information.

FIG. 11 is a view more specifically illustrating a configuration of the filter coefficient information included in the encoded data generated by the moving image encoding device according to the embodiment, so as to be inputted to the moving image decoding device according to the embodiment.

DESCRIPTION OF EMBODIMENTS

Figure 1:
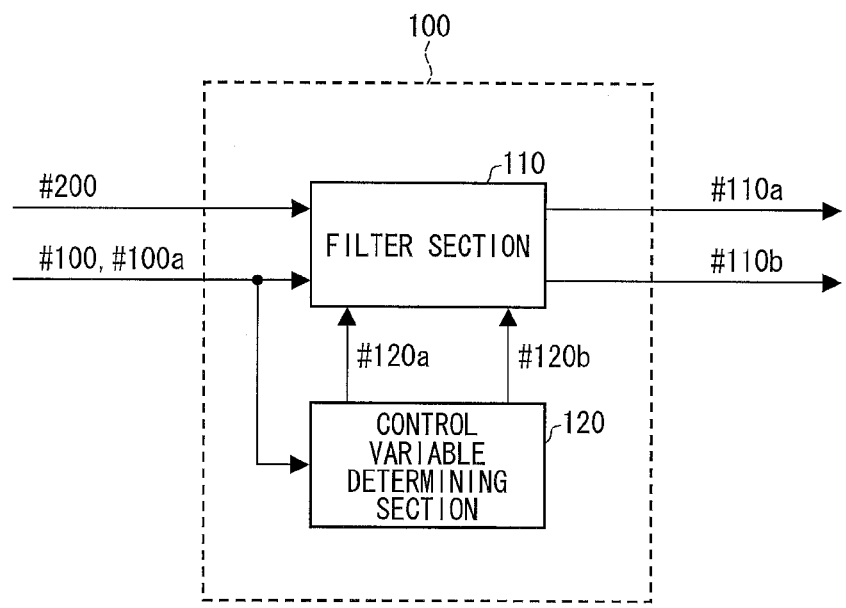
FIG. 1 is a block diagram illustrating a configuration of an adaptive filter according to one embodiment.

A configuration of the adaptive filter 100 according to one embodiment is explained, referring to FIG. 1.

FIG. 1 is a block diagram illustrating a configuration of the adaptive filter 100. As illustrated in FIG. 1, the adaptive filter 100 includes a filter section 110 and a control variable determining section 120.

The adaptive filter 100 is a image filter capable for filtering image data. The adaptive filter 100 can perform filtering for unit areas in an image of image data on unit area basis by taking the unit area as a target of the filtering, wherein the adaptive filter 100 performs the filtering adjusted adaptively for respective areas (filtering target area T) obtained by dividing the unit area.

The adaptive filter 100 is suitable applicable for a moving image encoding device for encoding moving image data, or a moving image decoding device for decoding such encoded moving image data, for example.

The adaptive filter 100 generates and outputs output image data #110a by obtaining weighted linear sum, based on a filter coefficient, of pixel values contained in a certain area, among pixel values in inputted image data #100.

Moreover, the adaptive filter 100 receives teacher data #200. The teacher data #200 is image data indicative of teacher image, which is referred to when the filter coefficient is determined as described later. One specific example of the teacher data #200 is input image data inputted in the image encoding device provided with the adaptive filter 100.

Moreover, the adaptive filter 100 outputs filter coefficient information #110b together with the output image data #110a. The filter coefficient information #110b is information regarding a filter coefficient used for filtering.

The adaptive filter 100 obtains the weighted linear sum based on the filter coefficient that is adjusted per area according to the image data #100 and to side information #100a of the image data #100.

The side information #100a of the image data #100 is information obtained from encoded data necessary for generating the image data #100. That is, side information #100a of the image data #100 includes all of transformation coefficients necessary for generating prediction residual, a size of frequency transformation, information of quantum parameter, information necessary for generating predicted image (i.e., prediction mode, a size of motion compensation, motion vector, information on reference frame etc., weight information for weighted prediction, information on block and positions of block boarders).

The filter coefficient information #110b is information including the filter coefficient and information necessary for generating the filter coefficient. Specific examples of the filter coefficient information #110b will be given later.

The present invention is not limited to the configuration described herein in which the filter target area T has a rectangular shape of MT×NT. For example, the filter target area T may be a single pixel, or a block or macro block. Moreover, the filter target area T is not limited to a rectangular shape, and may be rhombus, circular, a line segment (vertical, horizontal, or diagonal line segment), or another shape. Moreover, the size of the filter target area T may or may not be fixed; thus may be variable. For example, if the size of the filter target area T is variable block size variable according to transformation or motion compensation, it is appropriate that the area T is the variable block.

Hereinafter, sections of the adaptive filter 100 are explained.

The control variable determining section 120 receives (i) the image data #100 and (ii) the size information #100a of the image data #100, and supplies control variable #120a and control base #120b to a filter section 110.

The filter section 110 calculates out output image data #110a for respective pixel values of the image data #100 by performing filter coefficient-based weighted liner summation and offset value addition for pixel values included in a certain area.

More specifically, the filter section 110 performs weight linear summation as expressed in Equation (1), thereby to find a pixel value SO (x', y') at coordinates (x', y') in the output image data #110a.

[Math. 1]

$$S_O(x', y') = \left( \sum_{(i,j) \in R} h(i, j) S_I(x+i, y+j) \right) + h_{offset} \quad (1)$$

where SI (x, y) is a pixel value at the coordinates (x, y) of the image data #100, h (i, j) is a filter coefficient with which the pixel value SI (x+i, y+j) is multiplied, R is an area constituted with pixels with which the weighted linear summation is performed (hereinafter, this area is called a filter reference area). More specifically, R is a set of relative coordinates of pixels with which the weighted linear summation is performed. For instance, in case of 3×3-tapped filtering around a pixel of coordinates (x, y), R={(−1,−1), (−1,0), (−1,1), (0,−1), (0,0), (0,1), (1,−1), (1,0), (1,1)}. Moreover, hoffset is the offset value to be added to the pixel value. Here, the coordinates (x', y') and the coordinates (x, y) may be identical with each other, or may be different from each other provided that they are one-to-one correspondence with each other. Moreover, the present invention is not limited as to how to associate the coordinates (x', y') and the coordinates (x,y) with each other. How to associate the coordinates (x', y') and the coordinates (x,y) with each other is determined depending on a concrete configuration of an image processing device to which the adaptive filter 100 is provided.

In general, M×N tapped filtering can be defined by a filter coefficient matrix H, which is a M×N matrix whose components are filter coefficients h (i, j), and the offset hoffset.

In the following, the present embodiment is explained based on an example in which the filter reference area is a rectangular M×N tapped area. It should be noted that the present invention is not limited to this example, and is applicable to filter reference areas R having a rhombus shape, a circular shape, a line segment (vertical, horizontal, or diagonal line segment), or another shape.

Hereinafter, the filter coefficient and the offset are expressed by vector notation in which the components of the filter coefficient matrix H and the offset hoffset are mapped into vectors of M×N+1 dimension.

More specifically, the filter coefficient matrix H expressed by the following Equation (2),

[Math. 2]

$$H = \begin{pmatrix} h_{11} & h_{12} & \ldots & h_{1N} \\ h_{21} & h_{22} & \ldots & h_{2N} \\ & & & \\ h_{M1} & h_{M2} & \ldots & h_{MN} \end{pmatrix} \quad (2)$$

and the offset hoffset are mapped into the filter coefficient vector V of M×N+1 defined in Equation (3) below.

[Math. 3]

$$V = (h_{11}, h_{12}, \ldots, h_{1N}, h_{21}, h_{22}, \ldots, h_{2N}, \ldots, h_{M1}, h_{M2}, \ldots, h_{MN}, h_{offset}) \quad (3)$$

As shown in Equation (3), 1st to M×N-th components in the filter coefficient vector V represent filter coefficient h (i, j). The last component (hereinafter, referred to as offset component) in the filter coefficient vector V represents the offset h offset.

The use of such notation makes it possible to express the filter coefficient h (i, j), and the offset hoffset in a unified manner.

Hereinafter, the components of the filter coefficient vector V are expressed as v(K) with a 1 dimensional suffix K. For instance, the components of the filter coefficient vector V in the above example are expressed as follows: v(1)=h(1, 1), v(2)=h(1,2), ..., v(M×N)=v(M, N), and v(M×N+1)=hoffset.

In general, the relationship between the 1-dimensional suffix K and the 2-dimensional suffix (i, j) may be expressed as i=K % M+1, and j=K/M+1, where % is reminder. That is, x % y is a reminder remained after dividing x with y. Moreover, x/y is a result of rounding out fractional part of the result of dividing x with y (that is, x/y is a result of operation of Floor function).

With these notations, Equation (1) can be expressed as Equation (4):

[Math. 4]

$$S_O(X') = \sum_{K \in R'} v(K) S_I(X+K) \quad (4)$$

where SO (X') and SI (X+K) are 1-dimensional notations corresponding to SO (x', y') and SI (x+i, y+j). Moreover, the offset component for SI (X+K) is defined as 1. That is, it is defined for the M×N tapped filtering that SI (X+K)=1 when K=M×N+1. Furthermore, it is assumed that summation with respect to K covers not only the area R but also the offset component. In other words, it is assumed that the summation over the area R' includes not only 1-dimensional summation to the filter reference area R but also summation to the offset component.

Moreover, the 1st to M×N-th components in the filter coefficient vector may or may not be independent from each other. For example, the filter coefficient vector V has been conventionally restricted to be in vertically or horizontally bilateral symmetry or point symmetry. For example, in case of horizontal bilateral symmetry for 3×1 tapped filter (4 tapped including the offset), the filter coefficient vector V can be expressed as below:

[Math. 5]

$$\begin{pmatrix} v1 \\ v2 \\ v3 \\ v4 \end{pmatrix} = w1 \begin{pmatrix} 0 \\ 1 \\ 0 \\ 0 \end{pmatrix} + w2 \begin{pmatrix} 1 \\ 0 \\ 1 \\ 0 \end{pmatrix} + w3 \begin{pmatrix} 0 \\ 0 \\ 0 \\ 1 \end{pmatrix} \quad (5)$$

where w1, w2, and w3 are elements of filter coefficient vector W. In this example, the 4-dimensional filter coefficient vector V are expressed by using 3-dimensional filter coefficient vector W, thereby reducing its degree of freedom by 1. Here, vectors for w1, w2, and w3 are called "bases". In case where the bases are unit bases, W=V.

Expression capacity of the filter is reduced as much as the degree of freedom is reduced. Meanwhile, the reduction in degree of freedom leads to reduction in parameters necessary for expressing the filter (hereinafter, the parameters are referred to as filter parameters. In this example, the components of the filter coefficient vector W). By this, code quantity can be reduced. For example point symmetry has been widely adopted for this purpose.

In this Specification, a function for calculating out the filter coefficient vector V from the filter parameters is referred to as a filter calculating function F. Equation (5) is one example of such a filter calculating function F. It should be noted that the base is not limited to symmetric bases as described above, and may be another bases.

Moreover, the present invention is not limited to the aforementioned explanation in which the weighted linear summation based on the filter coefficient vector V (or the filter coefficient matrix H) is discussed as one example. In other words, the filtering of the adaptive filter 100 according to the present invention is not limited to the weighted linear summation and may adopt weighted non-linear summation using the component of the filter coefficient vector V.

The adaptive filter 100 according to the present embodiment can switch over the filter coefficient vector V according to the side information #100a, the pixel values included in the image data #100, positions of the pixels included in the image data #100, or functions thereof.

<Examples of Filtering Process Performed by Adaptive Filter 100>

<Example in which the Filter Coefficient is Switched Over Depending on Whether to Perform the Filtering in a Skip Mode or not>

In the following, one example of filter coefficient vector calculation of the adaptive filter 100, and switching-over of the filter coefficient vector, based on the way of notation explained above. Especially, the following explanation is based on a case where the adaptive filter 100 switches over the filter coefficient vector, depending on whether or not a pixel at the coordinates (x, y) in the image data #100 belongs to a macro block to which the skip mode in H.246/AVC standard is applied.

(Step S1)

The control variable determining section 120 sets a control variable v_skip to 1, wherein the control variable v_skip is either 0 or 1 depending on whether or not a pixel at the coordinates (x, y) in the image data #100 belongs to a macro block to which the skip mode is applied. Then, the control variable determining section 120 outputs the control variable v_skip to a filter section 110.

Moreover, the control variable determining section 120 outputs a filter base b_skip to the filter section 110. The filter base b_skip is associated with information (hereinafter, referred to as skip information) regarding whether or not the pixel at the coordinates (x, y) in the image data #100 belongs to the macro block to which the skip mode is applied.

Here, the filter base b_skip is a base vector constituted from base components corresponding to the components of the filter coefficient vector V. That is, the filter base b_skip is a M×N+1 dimensional vector in the case of the M×N-tapped filtering.

The filter base b_skip may be, for example, edge-stress/edge-blurred filter base, preferably. The edge-stress/edge-blurred filter base is a filter base effective to stress an edge or to blur the edge. Examples of the edge-stress/edge-blurred filter base encompass a base for double differentiating filter. Hereinafter, the edge-stress/edge-blurred filter base may be abbreviated simply as an edge-stress filter base. However, it should be noted that the edge-stress filter base has a blurring effect as well.

Examples of the edge-stress filter base encompass, for the case of 3×3 tapped filtering, a horizontal edge stress base (0, 0, 0, −1, 2, −1, 0, 0, 0,0), a vertical edge stress base (0, −1, 0, 0, 2, 0, 0, −1, 0, 0), a standard Laplacian base (−1, −1, −1, −1, 8, −1, −1, −1, −1, 0), a modified Laplacian base (−1, −2, −1, −2, 12, −2, −1, −2, −1, 0), a first diagonal Laplacian base (−1, −2, 0, −2, 6, 0, −1, 0, 0, 0), a second diagonal Laplacian (0, 0, −1, 0, 6, −2, 0, −2, −1, 0), and the like.

The control variable determining section 120 outputs, to the filter section 110, an edge-stress filter base or its linear sum thereof as the filter base b_skip.

(Step S2)

The filter section 110 determines the filter coefficient vector V, slice by slice or frame by frame. Here, the components v(k) of the filter coefficient vector V are expressed by Equation (6) below:

$$v(K)=w(K)+a\_skip \times v\_skip \times b\_skip(K) \quad (6)$$

where w(K) is a component of the filter coefficient vector W (fixed coefficient vector), b_skip (K) is a component of the above-mentioned filter base (fixed vector) b_skip. Moreover, v_skip is a control variable (variable coefficient) described above, and is a control variable that has been set as v_skip=1 at Step S1. Furthermore, a_skip a coefficient (fixed coefficient) associated to the control variable v_skip.

The term "fixed" in the fixed vector and fixed coefficient means that the value does not vary depending on the position of the pixel. The term "variable" in the fixed vector and fixed coefficient means that the value varies depending on the position of the pixel.

Equation (6) is one example of the filter calculation function F using the control variable, and the filter parameters in the function F are the fixed coefficient vector, fixed coefficient, and control variable.

For each of the unit areas such as slices or frames, the filter section 110 determines fixed ones (hereinafter, referred to as fixed filter parameter) common to each area among the filter parameters. Here, the fixed ones among the filter parameter thus determined are the components w(K) of the fixed coefficient vector W and the fixed coefficient a_skip.

When the coefficient concerning the edge-stress base b_skip(K) is positive in Equation (6) (in this example, when a_skip is positive), it is possible to obtain edge stressing effect in an area in which the control variable v_skip=1. On the contrary, when the coefficient concerning the edge-stress base b_skip(K) is negative in Equation (6) (in this example, when a_skip is negative), it is possible to obtain edge blurring effect in an area in which the control variable v_skip=1.

The filter section 110 can determine the fixed filter parameter by, for example, statistical approach.

One specific example of determining the fixed filter parameter is to determine the fixed filter parameter that can minimizes a square error E from the pixel values in the teacher data #200, the square error E being expressed by Equation (7) below.

[Math. 6]

$$E = \sum_X \left( S(X) - \sum_{K \in R'} v(K) S_I(X+K) \right)^2 \quad (7)$$

where S(X) is a pixel value at coordinates (x, y) in the teacher data #200. Sum with respect to X is sum of all the pixels included in the unit area. That is, in case where the fixed filter parameter is determined per slice, the sum with respect to X is sum for all the pixels included in a slice in question. Even though this example is configured such that the sum with respect to X is the sum for all the pixels included in the unit area, it may be so configured that the sum with respect to X is sum for some of the pixels included in the unit area. For example, in case where the filter section 110 is used as an adaptive de-blocking filter, it is appropriate to determine the fixed filter parameter only from a processing area restricted to pixels distanced from a block border by a certain distance or a distance shorter than that. Moreover, in case where an area not to be subjected to the filtering is provided inside a unit area to be subjected to the filtering, and information regarding whether to perform the filtering is encoded, it is appropriate to determine the fixed filter parameter from pixels in the area to be subjected to the filtering.

More specifically, the filter parameter V in Equation (7) is transformed into a function of the filter parameters by using the filter calculating function F. Next, an equation thus obtained is partially differentiated with the fixed parameters, and then is set to be zero, thereby obtaining an equation generally called normal equation. The normal equation is solved by a process of Gaussian elimination etc., so as to calculate out the fixed parameters. In the calculation of the fixed parameters, S, SI, and the control variable (here, v_skip), which each pixel or each area uniquely has, are substituted in the calculation.

The introduction of the control variable v_skip can be expressed as M×N+2 tapped, like the introduction of the offset is expressed as M×N+1 tapped filter. In this case, the dimensions of V is expanded to M×N+2 dimensions by putting the M×N+2-th term in v as v(M×N+2)=a_skip, and the dimensions of SI is expanded by putting the M×N+2-th term in SI as SI(M×N+2)=Σv_skip×b_skip(K)×SI(K). By using such expression, to determine the M×N+2 numbers of v values, which can minimize Equation (7) becomes the question.

One other specific example of the method for determining the filter coefficient vector V is to determine a filter coefficient vector that minimizes an absolute value error obtained by replacing the square calculation in the square error E with absolute value calculation. Moreover, it is possible to use, as an object function, a function obtaining adding the square error E and a value obtained by multiplying square of each terms in the filter coefficient vector with a certain constant (this is so-called ridge regression). In this way, it is possible to reduce the square error E while keeping the filter coefficient vector at a small value. In this case, the square error E becomes slightly larger than its minimal value, but the filter coefficient vector becomes small, thereby avoiding an increase in the code quantity. Note that the present invention is not limited to the statistical approach for determining the filter coefficient vector.

The adaptive filter 100 may be configured such that the statistical approach is used with the control variable being constantly 0, so that the vector coefficient vector V for the case where the changing the filter coefficient vector with the control variable is not performed is determined.

The filter coefficient vector V thus determined is such that a filter having a filter-stress effect due to contribution from the second term in Equation (6) when v_skip=1. On the other hand, when v_skip=0, the second term in Equation (6) does not make contribution, whereby the filter coefficient vector V can also express a filter having no filter-stress effect. In the following, the filter coefficient vector V for v_skip=1 is referred to as the filter coefficient vector V (v_skip=1), and the filter coefficient vector V for v_skip=0 is referred to as the filter coefficient vector V (v_skip=0).

(Step S3)

The control variable determining section 120 sets the value of the control variable v_skip depending on whether or not the pixel at coordinates (x, y) in the image data #100 belongs to a macro block to which the skip mode is applied. More specifically, the control variable determining section 120 sets the control variable v_skip as v_skip=1 when the pixel at coordinates (x, y) in the image data #100 belongs to a macro block to which the skip mode is applied, whereas the control variable determining section 120 sets the control variable v_skip as v_skip=0 when the pixel at coordinates (x, y) in the image data #100 belongs to a macro block to which the skip mode is not applied.

For the respective pixels included in the image data #100, the control variable v_skip thus set is supplied to the filter section 110.

(Step S4)

The filter section 110 calculates the pixel values of the output image data #110a by calculating out a weighted average of the pixel values in the image data #100 according to the components of the filter coefficient vector V using the control variable v_skip supplied from the control variable determining section 120. More specifically, the filter section 110 calculates out a pixel value SO (X') by applying the components of the filter coefficient vector V to Equation (4).

The adaptive filter 100 repeats the steps S3 an S4. Thus, the adaptive filter 100 can perform the filtering with different filter coefficient vectors, depending on whether or not the pixel included in the image data #100 belongs to a macro block to which the skip mode is applied. To be more exact, the adaptive filter 100 performs filtering based on the filter coefficient vector V (v_skip=1) when a pixel at coordinates (x, y) in the image data #100 belongs to a macro block to which skip mode is applied, whereas the adaptive filter 100 performs filtering based on the filter coefficient vector V (v_skip=0) when a pixel at coordinates (x, y) in the image data #100 belongs to a macro block to which skip mode is not applied.

Therefore, the adaptive filter 100 performs filtering having the edge-stress effect when a pixel at coordinates (x, y) in the image data #100 belongs to a macro block to which skip mode is applied, whereas the adaptive filter 100 performs filtering having no edge-stress effect, when a pixel at coordinates (x, y) in the image data #100 belongs to a macro block to which skip mode is not applied.

In general, there is a tendency that edge-stressing is preferable for an image in the macro block to which the skip mode is applied, compared with the macro block to which the skip mode is not applied.

Therefore, the use of the adaptive filter 100 with the above configuration makes it possible to perform filtering in such a way that the edge stressing is applied for the macro block to which the skip mode is applied, but it is avoided to apply excessive edge stressing to the macro block to which the skip mode is not applied. Thus, the use of the adaptive filter 100 with the above configuration makes it possible to perform more effective filtering, compared with the conventional configuration in which the filter coefficient is not switched over.

Depending on sequences, there are some cases that blurring is preferably in the skip mode. In such a case, the adaptive filter 100 with the above configuration can perform optimal blurring processing by determining a_skip as a negative value.

Moreover, the adaptive filter 100 can switch over the filter coefficient vector V by setting the value of the control variable v_skip to 1 or 0. That is, the adaptive filter 100 can switch over the filter coefficient per macro block without calculating out the filter coefficient per macro block. This makes it possible to perform effective filtering while reducing the calculation load necessary to calculate out the filter coefficient.

In case where a plurality of macro blocks are including in the filter target area T, skip information assigned to one of the macro blocks may be used.

As described above, the image filter (adaptive filter 100) according to the present embodiment is an image filter for calculating a pixel value of a target pixel in an output image (output image data #110a) from a pixel value of each of a pixel or pixels belonging to a target area (filter reference area R) in an input image (image data #100) and from a filter coefficient vector (filter coefficient vector V), the image filter comprising: filter coefficient vector changing means (control variable determining section 120) for changing the filter coefficient vector according to at least either where the target area is positioned in the input image or where the target pixel is positioned in the output image.

With this configuration, in which the filter coefficient vector changing means (control variable determining section 120) for changing the filter coefficient vector according to at least either where the target area is positioned in the input image or where the target pixel is positioned in the output image is provided, it is possible to perform filtering as appropriate for individual target areas according to at least one of the position of the target area and the position of the target area in the output image.

Moreover, the image filter (adaptive filter 100) according to the present embodiment is configured such that the filter coefficient vector (filter coefficient vector V) can be divided into a sum of fixed filter coefficient vectors and a variable filter coefficient vector, wherein the fixed filter coefficient vectors (filter coefficient vectors calculated out from the fixed coefficient vector W) are predetermined per unit area constituting the output image, and the variable filter coefficient vector is changed by the filter coefficient vector changing means (control variable determining section 120) according to at least either where the target area (filter target area T) is positioned in the input image (image data #100) or where the target pixel is positioned in the output image.

With this configuration, the filter coefficient vector can be divided into the sum of the fixed filter coefficient vectors and the variable filter coefficient vector, wherein the fixed filter coefficient vectors are predetermined per unit area constituting the output image, and the filter coefficient vector changing means can change the variable filter coefficient vector according to at least either where the target area is positioned in the input image or where the target pixel is positioned in the output image.

Therefore, with this configuration, it is possible to perform filtering as appropriate for individual target areas (i.e. filtering suitable for features of image in the individual target areas) by using a filter coefficient predetermined per unit area.

If the present invention is applied to H. 264, the unit area may be a slice, a macro block, or a block.

Moreover, the fixed filter coefficient vector and the variable filter coefficient vectors may be defined to include an offset component.

Moreover, the image filter (adaptive filter 100) according to the present embodiment is further configured such that the filter coefficient vector can be divided into a fixed coefficient, a variable coefficient, and a fixed vector, wherein the fixed coefficient (for example, a_skip) is predetermined per unit area constituting the output image, the variable coefficient (control variable, for example, v_skip) is changed by the filter coefficient vector changing means according to either where the target area (filter target area T) is positioned in the input image (image data #100) or where the target pixel is positioned in the output image, and the fixed vector (filter base, for example, b_skip is predetermined.

With this configuration, the variable filter coefficient vector is further configured that the variable filter coefficient vector can be divided into the fixed coefficient determined per unit area constituting the output image, the variable coefficient, and the fixed vector. Moreover, the fixed vector is predetermined and the filter coefficient vector changing means can change the variable coefficient according to either where the target area (filter target area T) is positioned in the input image (image data #100) or where the target pixel is positioned in the output image. Therefore, with this configuration, the filtering can be performed more appropriately for the feature of the image in the target area.

Moreover, with this configuration, it is possible to perform adaptive filtering of different types as desired for the individual target area by supplying the image filter with the fixed coefficient vector and the fixed coefficient determined per unit area constituting the output image.

The effect of the above configuration according to the present invention is explained below, referring to FIG. 2.

Figure 2:
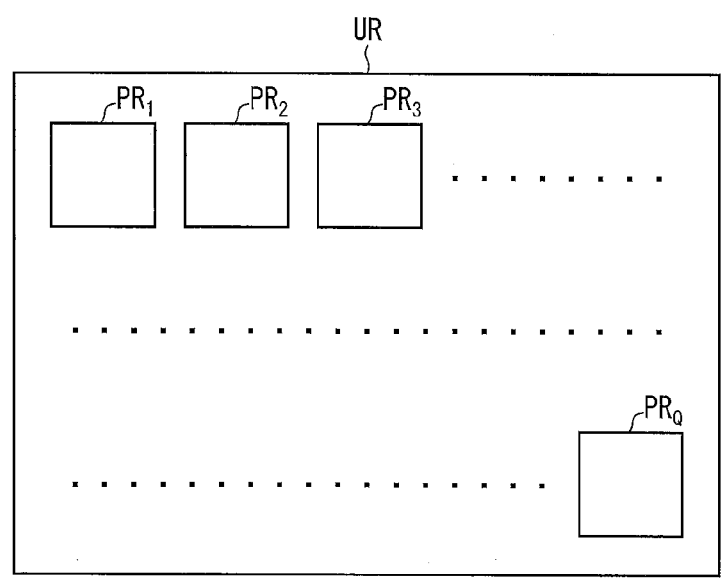
FIG. 2 is a view for explaining an effect of the adaptive filter according to the present embodiment, and illustrates a unit area including a plurality of target areas.

FIG. 2 is a view illustrating a case where a Q number (Q≥2) of target areas PR1 to PRQ are present on an unit area UR.

Consider a case where the Q number of target areas PR1 to PRQ on the unit area UR as illustrated in FIG. 2 is to be filtered with the above configuration. Assuming that the number of the component of the fixed coefficient vector W is P (P≥2), and the number of the fixed coefficient is 1, this configuration can make it possible to perform the filtering adaptively for all the individual Q number of target areas PR1 to PRQ by using the P+1 number of filter coefficients in total.

On the other hand, according to the conventional method in which the fixed coefficient vector W is calculated out for every target areas PRn (1≤n≤Q) in case a Q number of target areas PR1 to PRQ are present on an unit area UR as illustrated in FIG. 2, a P×Q number of filter coefficients are necessary for performing such adaptive filtering.

Therefore, according to the configuration according to the present invention, it is possible to perform different types filtering adaptively for the individual target areas by using a smaller number of filter coefficients, compared with a configuration in which the filter coefficient vector is calculated out for every target areas individually.

Note that the Q number of target areas PR1 to PRQ overlap with one another in general, even though FIG. 2 illustrates them as areas not overlapping each other.

While the above explanation describes the feature of the present invention by using the vector expression for the filter coefficients, the present invention can be expresses as operations on the components in the filter coefficient.

For instance, consider a case of a 3×3 tapped filtering wherein b_skip is horizontal edge stress base (0, 0, 0, −1, 2, −1, 0, 0, 0, 0). In this case, the components in the filter coefficient vector V can be expressed as below (see Equation (6)).

$$(w(1), w(2), w(3), w(4) - a\_skip \times v\_skip, w(5) + 2 \times a\_skip \times v\_skip, w(6) - a\_skip \times v\_skip, w(7), w(8), w(9), w \quad (10))$$

As understood from the above equation, the 1st to 3rd, and 7th to 10th components in the filter coefficient vector V are not dependent on the control variable v_skip when b_skip is horizontal edge stress base (0, 0, 0, −1, 2, −1, 0, 0, 0, 0). That is, regardless of whether in the skip mode or not, the 1st to 3rd, and 7th to 10th components in the filter coefficient vector V are constant values predetermined by the statistical approach.

On the other hand, when b_skip is horizontal edge stress base (0, 0, 0, −1, 2, −1, 0, 0, 0, 0), the 4th to 6th components in the filter coefficient vector V are dependent on the control variable v_skip. Moreover, how much the 4th to 6th components in the filter coefficient vector V are changed in with respect to the control variable v_skip is specified by the filter base b_skip.

In other words, when b_skip is horizontal edge stress base (0, 0, 0, −1, 2, −1, 0, 0, 0, 0), certain components (4th to 6th components) in the filter coefficient vector V are changed according to the value the control variable v_skip, and the other components (1st to 3rd, and 7th to 10th components) other than the certain components are determined independent of the value of the control variable v_skip.

Therefore, in general, which one of the components of the filter coefficient vector V is changed depending on the control variable and which one of the filter coefficient vector V is changed independently of the control variable are determined according to the filter base outputted from the control variable determining section 120. Moreover, how much the component dependent on the control variable is changed with respect to the control variable is determined by the filter base outputted from the control variable determining section 120.

<Filter Coefficient Derivation Process>

Moreover, a filter coefficient derivation process of Equation (6) can be obtained separately for a component changing according to the control variable and for a component not changed according to the control variable. In the following, the filter coefficient derivation process performed by the adaptive filter 100 is explained referring to FIG. 3, based on an example in which b_skip is horizontal edge stress base (0, 0, 0, −1, 2, −1, 0, 0, 0, 0).

Figure 3:
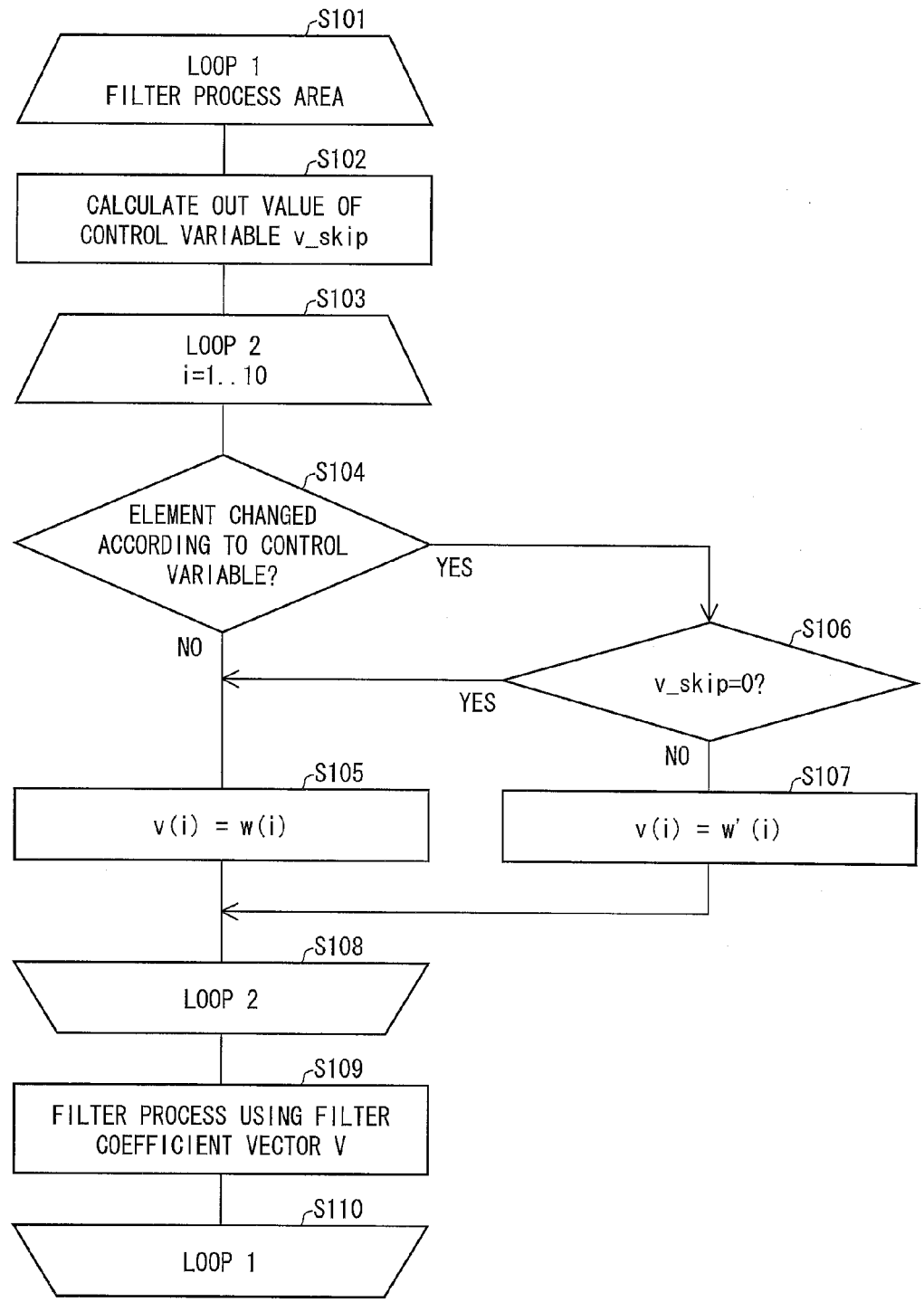
FIG. 3 is a flowchart illustrating one example of a flow of a filter coefficient determining process for the adaptive filter of the present embodiment.

FIG. 3 is a view illustrating one example of an operation flow for the filtering process.

(Preliminary Step)

In advance, the adaptive filter 100 calculates out w' (i) by using Equation (6) with the filter coefficient vector changing according to the control variable, and keeps w' (i) thus calculated out.

$$w'(4) = w(4) + a\_skip \times v\_skip \times b\_skip(4)$$
$$= w(4) + a\_skip \times v\_skip \times -1$$
$$w'(5) = w(5) + a\_skip \times v\_skip \times 2$$
$$w'(6) = w(6) + a\_skip \times v\_skip \times -1$$

(Filtering Step)

(Step S101) Loop 1: for every filter target area T, processes S102 to S109 are performed for the whole unit area constituting the output image.

(Step S102) Calculate out a control variable v_skip for a filter target area T.

(Step S103) Loop 2: S104 to S108 are performed until a loop variable i becomes 10 from 1.

(Step S104) If the component v(i) of the filter coefficient vector for the loop variable i is not changed according to the control variable, the process goes to S105. That is, when i=1, 2, 3, 7, 8, 9, 10, the process goes to S105. Otherwise, the process goes to S106.

(Step S105) Determine that v(i)=w(i). The process then goes to S108.

(Step S106) If the control variable v_skip=0, goes to S105. If the control variable v_skip=1, goes to S107.

(Step S107) Determine that v(i)=w'(i). Then the process goes to S108.

(Step S108) End loop 2.

(Step S109) Perform filtering expressed as Equation (4), by using the filter coefficient vector V thus derived.

(Step S110) End Loop 1

In the above the derivation of the filter coefficient vector V is carried out by branching, but not by using the summation with the component changing according to the control variable. The process using the summation and the process using branching seem to be different processes, but both the processes produce the same result, and the present invention encompasses both the processes. The control variable for use in the branching is not limited to the above, and may be any control variable including the following example.

Figure 4:
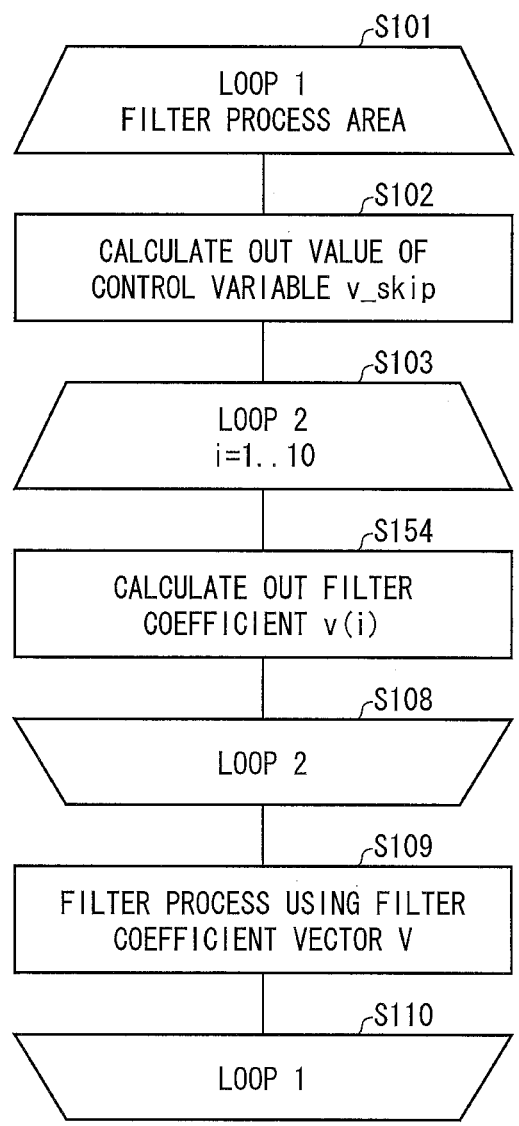
FIG. 4 is a flowchart illustrating another one example of a flow of a filter coefficient determining process for the adaptive filter of the present embodiment.

FIG. 4 is a view illustrating another example of the operation flow for the filtering. FIG. 4 illustrates a case where the calculation of the filter coefficient vector V is carried out by using the summation with the component changing according to the control variable. In this example, the processes in S103 to S107 in FIG. 3 are replaced with the following step S154 using Equation (6).

(Step S154) Calculate out the element v(i) of the filter coefficient vector from Equation (6) by using the control variable v_skip.

It may be preferable that (i) before the filtering, the values of the filter coefficient has been stored in a 2-dimensional table v2 (i, v) predetermined according to the positions of the components of the filter coefficient and the values of the control variable, the values of the filter coefficient being stored in the 2-dimensional table v2 (i, v) in such a way that the values of the filter coefficient are associated with the positions of the components of the filter coefficient and the values of the control variable, and (ii) the filtering is performed with reference to the 2-dimensional table v2 (i, v). Here, i is a position of the component of the filter coefficient, and v is a value of the control variable. Note that, if the number of the control variable is 1, the table is a 2-dimensional table, and if the number of the control variable is Nv, the table is a Nv+1 dimensional table.

So far, the expression for the function for the components of the filter coefficient vector V according to the present invention is explained.

<General Example of the Filter Calculating Function>

Equation (6) is one example of the filter calculating function F. Where the fixed coefficient vector wi ($1 \leq i \leq Nw$, where Nw is the number of dimensions for the fixed coefficient vector), the control variable vk ($1 \leq k \leq Nv$, where Nv is a total number of the control variables), the fixed coefficient akj (k is as described above, $1 \leq j \leq Nak$, where Nak is a total number of the fixed coefficients regarding a control variable Vk, the function F is generally expressed as in Equation (8).

$$F(w1 \ldots ,wNw, a11, \ldots ,a1\_Na1, \ldots ,aNv1, \ldots , aNv\_NaNv,v1, \ldots vNv) = F1(w1 \ldots ,wNw) + F2(Na1, \ldots ,aNv1, \ldots ,aNv\_NaNv,v1, \ldots ,vNv) \quad (8)$$

Here, the filter calculating function F has a structure that can be divided into the fixed filter coefficient vector in the 1st term and the variable filter coefficient vector in the 2nd term. F1 is a function of the fixed coefficient vector and F2 is a function of the control variable and the fixed coefficient. Here, the control variable and fixed coefficient may be plural. If the control variable is plural, the number of the fixed coefficients may be changed according to the control variable.

Assuming that all the functions F are linear operations, they can be expressed as Equation (9).

[Math. 7]

$$V = \sum_{i=1}^{Nw} wi \times b\_wi + \sum_{k=1}^{Nv} \sum_{j=1}^{Nak} akj \times vk \times b\_vkj \quad (9)$$

Here, b_wi is a Nw number of bases regarding wi, and may be a unit base, symmetric base, or the like. In the present Specification, b_wi is a unit base, but the present invention is not limited to this. Further, b_vkj is a Nak number of bases prepared for each of the control variables vk, and may be the edge-stress filter baser or the like. In case the b_wi is a symmetric base, it is preferable that b_vkj is a base having similar symmetry. Moreover, the left-hand side of Equation (9) can be divided into the fixed filter coefficient vector in the 1st term and the variable filter coefficient vector in the 2nd term as shown in its right-hand side. Moreover, the fixed filter coefficient vector can be divided into the fixed coefficient vector (element wi) and base (b_wi). The variable filter coefficient vector can be divided into the fixed coefficient (akj), the control variable (vk), and the fixed vector (b_vkj).

One concrete example where the filter is 4-dimensional filter is shown in Equation (10).

[Math. 8]

$$\begin{pmatrix} v1 \\ v2 \\ v3 \\ v4 \end{pmatrix} = w1 \begin{pmatrix} 0 \\ 1 \\ 0 \\ 0 \end{pmatrix} + w2 \begin{pmatrix} 1 \\ 0 \\ 1 \\ 0 \end{pmatrix} + w3 \begin{pmatrix} 0 \\ 0 \\ 0 \\ 1 \end{pmatrix} + a\_skip1 \times v\_skip \times \begin{pmatrix} -1 \\ 2 \\ -1 \\ 0 \end{pmatrix} + \\ a\_skip2 \times v\_skip \times \begin{pmatrix} 0 \\ 0 \\ 0 \\ 1 \end{pmatrix} + a\_flat \times v\_flat \times \begin{pmatrix} 0 \\ 0 \\ 0 \\ 1 \end{pmatrix} \quad (10)$$

In this example, the number of the fixed filter coefficients is 3 (w1, w2, w3), and the number of the fixed coefficients corresponding to the control variable v_skip is 2 (a_skip 1 and a_skip 2), and the number of the fixed coefficient corresponding to the control variable v_flat is 1 (a_flat). The meaning of the control variable v_flat will be later explained.

<General Example of the Fixed Filter Parameter Calculation>

As explained above, the fixed filter parameter calculation is carried out by solving a normal equation obtained by zeroing an equation obtained by partially differentiating an equation obtained by transforming the filter parameter V of Equation (7) into a function of the filter parameter by using the filter calculating function F.

The following describes an example in which another base is used as the base regarding the control variable, and an example in which another variable is used as the control variable, and effects of these examples.

Note that the present invention is not limited to the above Example described based on the case where the filter base b_skip is an edge-stress filter base. For example, the control variable determining section 120 may be configured to output to the filter section 110 a plurality of filter bases as the filter bases associated with the skip information, the plurality of filter bases being having different effects.

For example, the control variable determining section 120 may be configured to output to the filter section 110 an edge-stress base b_skip 0 and DC offset base b_dc=(0, 0, 0, 0, 0, 0, 0, 0, 1) as the filter bases associated with the skip information.

In case where the control variable determining section 120 outputs the edge-stress base b_skip and the DC offset base b_dc, the filter section 110 determines, with reference to the teacher data #200, the coefficients of the filter coefficient vector V having the components (K) expressed by the following Equation (11).

$$v(K)=w(K)+a\_skip \times v\_skip \times b\_skip(K)+a\_dc \times v\_dc \times b\_dc(K) \quad (11)$$

where a_dc is the DC offset coefficient (fixed coefficient) corresponding to the DC offset base.

Per slice or per frame, the filter section 110 determines the components w(K) of the fixed coefficient vector W, the edge-stress coefficient a_skip, and the DC offset coefficient a_dc, for example by the aforementioned statistical approach.

For a pixel belonging to a macro block in which the skip mode is applied, the control variable determining section 120 outputs the control variable v_skip of 1 to the filter section 110. For a pixel belonging to a macro block in which the skip mode is not applied, the control variable determining section 120 outputs the control variable v_skip of 0 to the filter section 110.

The filtering section 110 performs filtering based on the filter coefficient vector V using the control variable v_skip supplied from the control variable determining section 120.

For the macro block in which the skip mode is applied, the adaptive filter 100 with such an arrangement can perform edge-stressing filtering and filtering for changing luminance by the DC offset.

It is also possible to perform adaptive filtering for pixel values of pixels whose luminance change individually, such as fading, by using the DC offset base and a center element base b_c=(0, 0, 0, 0, 1, 0, 0, 0, 0, 0) in which only center element is 1.

Moreover, the control variable determining section 120 may output to the filter section 110 another edge-stress base b_skip1 together with a certain edge-stress base b_skip0, as the filter base associated with the skip information. For example, it may be such that b_skip0 is a horizontal edge-stress base (0, 0, 0, −1, 2, −1, 0, 0, 0, 0), and b_skip1=(0, −1, 0, 0, 2, 0, −1, 0, 0, 0). Moreover, as an edge stress/blurring base, a base mainly for blurring such as a widthwise blurring base (0, 0, 0, 1, 2, 1, 0, 0, 0, 0), a lengthwise blurring base (0, 1, 0, 0, 2, 0, 0, 1, 0, 0), or a omnidirectional blurring base (1, 1, 1, 1, 2, 1, 1, 1, 1, 0) may be used.

In case where the control variable determining section 120 outputs the edge-stress base b_skip0 and b_skip1, the filter section 110 determines, with reference to the teacher data #200, the coefficients in the filter coefficient vector V having the components v(K) expressed by the following Equation (12).

$$v(K)=w(K)+a\_skip0 \times v\_skip \times b\_skip0(K)+a\_skip1 \times v\_skip \times b\_skip1(K) \quad (12)$$

Here, a_skip0 is an edge-stress coefficient (fixed coefficient) corresponding to the edge-stress base b_skip0(K), and a_skip1 is an edge-stress coefficient (fixed coefficient) corresponding to the edge-stress base b_skip1(K).

The filter section 110 determines, for example by the aforementioned approach, the components w(K) of the fixed coefficient vector, and the edge-stress coefficients a_skip0 and a_skip1 per slice or per frame.

For a pixel belonging to a macro block to which the skip mode is applied, the control variable determining section 120 outputs the control variable v_skip whose value is 1. For a pixel belonging to a macro block to which the skip mode is not applied, the control variable determining section 120 outputs the control variable v_skip whose value is 0.

The filter section 110 performs the filtering based on the filter coefficient vector V using the control variable v_skip supplied from the control variable determining section 120.

With this configuration, the adaptive filter 100 can perform the filter coefficient-based filtering having both the edge stress effect and the blurring effect for the macro block to which the skip-mode is applied. For the macro block to which the skip-mode is not applied, the adaptive filter 100 can perform the filter coefficient-based filtering having none of the edge stress effect and the blurring effect.

Moreover, the present invention is not limited to the above example in which the adaptive filter 100 switches over the filter coefficient vector V depending on whether or not the pixel included in the image data #100 belongs to a macro block to which the skip mode is applied.

In the following, the filter coefficient is switched over based on the image data #100 and the side information #100a.

(Example in which the Filter Coefficient is Switched Over Depending on Degree of Flatness in the Image)

Firstly, an example in which the filter coefficient is switched over depending on degree of flatness in the filter target area T in the image is described here. The degree of flatness in the filter target area T is an index that is set according to how much the pixel values of the pixels included in the filter target area T are uneven. When the pixel values of the pixels included in the filter target area T are less uneven, the degree of flatness of the image in the area is higher. When the pixel values of the pixels included in the filter target area T are more uneven, the degree of flatness of the image in the area is lower. In order to determine the control variable for the filter target area T, it is not necessary to use all the pixels in the filter target area T (thereinafter, the same is applied). The degree of flatness may be determined from a rectangular area MV×NV, which is smaller than the area T.

The control variable determining section 120 sets a value of a control variable v_flat to 1 and outputs the control variable v_flat to the filter section 110, wherein the control variable v_flat is set to a value of 0 or 1 depending on the degree of flatness in the filter target area T.

Moreover, the control variable determining section 120 outputs, to the filter section 110, the filter base b_flat associated with the degree of flatness in the filter target area T. The filter base b_flat may be, for example, the aforementioned edge-stress filter base, 5×5 tap-expanded Laplacian base (1, 1, 1, 1, 1, 1, 0, 0, 0, 1, 1, 0, −16, 0, 1, 1, 0, 0, 0, 1, 1, 1, 1, 1, 0), or a linear sum (or weighted linear sum) of them.

The filter section 110 determines, with reference to the teacher data #200, the coefficients of the filter coefficient vector V having the components v(K) expressed by the following Equation (13).

$$v(K) = w(K) + a\_flat \times v\_flat \times b\_flat(K) \quad (13)$$

where a_flat is a coefficient (fixed coefficient) corresponding to the filter base b_flat.

The filter section 110 determines the components w(K) of the filter coefficient vector and the coefficient a_flat per slice or per frame by for example the aforementioned statistical approach.

The control variable determining section 120 calculates out the unevenness of the pixel values of the pixels in the filter target area T for every pixel included in the image data #100. More specifically, for example, the control variable determining section 120 calculates out dispersion of the pixel values of the pixels in the filter target area T per pixel included in the image data #100.

In other words, the control variable determining section 120 refers to the pixel values of the pixels in the image data #100 individually, and calculates out the unevenness of the pixel value of each pixel in the filter target area T. More specifically, the control variable determining section 120 refers to the pixel values of the pixels in the image data #100 individually, and calculates out the dispersion of the pixel value of each pixel in the filter target area T.

The control variable determining section 120 sets the control variable v_flat to 0 for a pixel whose pixel value has dispersion equal to or greater than a predetermined threshold. The control variable determining section 120 sets the control variable v_flat to 1 for a pixel whose pixel value has dispersion less than the predetermined threshold. Then, the control variable determining section 120 outputs the control variables v_flat to the filter section 110 per pixel in the image data #100 individually.

Moreover, the control variable determining section 120 may be configured to output the control variable v_flat to the filter section 110 per filter target area T.

The filter section 110 performs the filtering based on the filter variable vector V using the control variable supplied from the control variable determining section 120.

It is known that, generally, different filter coefficients are optimal for areas having different degrees of flatness.

With this configuration, the adaptive filter 100 can perform filtering having a blurring effect for a filter target area T having a large degree of flatness, whereas the adaptive filter 100 can perform filtering having no blurring effect for a filter target area T having a small degree of flatness. Thus, the adaptive filter 100 can perform effective filtering adaptively for slices or frame having different degrees of flatness.

Even in case where the switching-over of the filter coefficient is performed according to the degree of flatness of image, the use of the filter base and filter coefficient corresponding to the DC offset makes it possible to perform filtering of luminance adjustment using the DC offset.

Moreover, in the present example, it may be configured such that the degree of flatness in the image in the filter target area T is judged according to how large an AC component associated with the block to which the pixel at the coordinates (x, y) in the image data #100.

Moreover, one specific example of the filter coefficient calculation process performed by the adaptive filter 100 in the present operation example is as follows. For example, assuming that the filter base b_flat is 3×3 horizontal edge-stress filter base, w'(i) in the (preliminary step) of the aforementioned <Filter Coefficient Calculation Process> may be calculated out by the following Equation, and stored.

$$w'(4) = w(4) + a\_flat \times v\_flat \times b\_flat(4)$$
$$= w(4) + a\_flat \times v\_flat \times -1$$
$$w'(5) = w(5) + a\_flat \times v\_flat \times 2$$
$$w'(6) = w(6) + a\_flat \times v\_flat \times -1$$

For the other steps in the <Filter Coefficient Calculation Process>, the control variable v_skip should be read as the control variable v_flat.

(Example in which the Filter Coefficient is Switched Over According to Edge Angle)

Next, an example in which the filter coefficient is switched over according to edge angle of an edge included in the image in the filter target area T of the image data #100 is described.

The control variable determining section 120 the following control variables to 1 and outputs the following control variables to the filter section 110.

control variable v_edge_0, being 0 or 1 according to whether or not the filter target area T has a vertical edge, control variable v_edge_90, being 0 or 1 according to whether or not the filter target area T has a horizontal edge, control variable v_edge_45, being 0 or 1 according to whether or not the filter target area T has a right-up diagonal edge, and control variable v_edge_135, being 0 or 1 according to whether or not the filter target area T has a right-down diagonal edge.

Moreover, the control variable determining section 120 outputs the following filter bases to the filter section 12.

filter base b_edge_0 associated with information regarding whether or not the filter target area T has a vertical edge, filter base b_edge_90 associated with information regarding whether or not the filter target area T has a horizontal edge, filter base b_edge_45 associated with information regarding whether or not the filter target area T has a right-up diagonal edge, filter base b_edge_135 associated with information regarding whether or not the filter target area T has a right-down diagonal edge.

The filter base b_edge_n (N=0, 45, 90, 135) is as follows, for example in the case of 3×3 tapped filtering.

b_edge_0=(0, −1, 0, 0, 2, 0, 0, −1, 0, 0)
b_edge_90=(0, 0, 0, −1, 2, −1, 0, 0, 0, 0)
b_edge_45=(0, 0, −1, 0, 2, 0, −1, 0, 0, 0)
b_edge_135=(−1, 0, 0, 0, 2, 0, 0, 0, −1, 0)

The filter section 110 determines, with reference to the teacher data #200, the coefficients of the filter coefficient vectors V having the components v (K) expressed by Equation (14) below.

$$v(K)=w(K)+\Sigma a\_edge\_n \times v\_edge\_n \times b\_edge\_n(K) \quad (14)$$

where the sign Σ indicates sum of the suffix n (n=0, 45, 90, 135) indicating the edge angle, and a_edge_n (n=0, 45, 90, 135) is a coefficient corresponding to the filter base b_edge_n (n=0, 45, 90, 135), respectively.

The filter section 110 determines the components w (K) of the fixed coefficient vector, coefficient a_edge_n (n=0, 45, 90, 135) per slice or per frame, for example by the aforementioned statistical approach.

The control variable determining section 120 sets the value of the control variable v_edge_n (n=0, 45, 90, 135) depending on which kind of the edge the filter target area T contains, and outputs the control variable v_edge_n (n=0, 45, 90, 135) to the output section 110 for every filter target area T.

v_edge_0=1, if the filter target area T contains a vertical edge, and v_edge_0=0, if not,
v_edge_90=1, if the filter target area T contains a horizontal edge, v_edge_90=0, if not,
v_edge_45=1, if the filter target area T contains a right-up diagonal edge, v_edge_45=0, if not,
v_edge_135=1, if the filter target area T contains a right-down diagonal edge, v_edge_135=0, if not.

The filter section 110 performs the filtering based on the filter coefficient vector V using the control variable v_edge_n (n=0, 45, 90, 135) supplied from the control variable determining section 120.

With this configuration, the adaptive filer 100 can perform filtering using different filter coefficients depending on the edge angle including in the target area T. Thus, it is possible to perform effective filtering for slices or frames having various edge angles.

The adaptive filter 100 may be configured such that the control variable determining section 120 outputs the following filter base to the filter section 110.

the first filter base b_edge_0_0=b_edge_0, where the first filter base b_edge_0_0 is associated with the information regarding whether the filter target area T contains a vertical edge, the second filter base b_edge_0_1=b_edge_90, where the second filter base b_edge_0_1 is associated with the information regarding whether the filter target area T contains a vertical edge, the first filter base b_edge_90_0=b_edge_90, where the first filter base b_edge_90_0 is associated with the information regarding whether the filter target area T contains a horizontal edge, the second filter base b_edge_90_1=b_edge_0, where the second filter base b_edge_90_1 is associated with the information regarding whether the filter target area T contains a horizontal edge, the first filter base b_edge_45_0=b_edge_45, where the first filter base b_edge_45_0 is associated with the information regarding whether the filter target area T contains a right-up diagonal edge, the second filter base b_edge_45_1=b_edge_135, where the second filter base b_edge_45_1 is associated with the information regarding whether the filter target area T contains a right-up diagonal edge, the first filter base b_edge_135_0=b_edge_135, where the first filter base b_edge_135_0 is associated with the information regarding whether the filter target area T contains a right-down diagonal edge, the second filter base b_edge_135_1=b_edge_45, where the second filter base b_edge_135_1 is associated with the information regarding whether the filter target area T contains a right-down diagonal edge.

In this case, the filter section 110 determines, with reference to the teacher data #200, the coefficients of the filter coefficient vector V having the components v(K) expressed by the following Equation (15).

$$v(K)=w(K)+\Sigma a\_edge\_n\_0 \times v\_edge\_n \times b\_edge\_n\_0 \\ (K)+\Sigma a\_edge\_n\_1 \times v\_edge\_n \times b\_edge\_n\_1(K) \quad (15)$$

where the sign Σ indicates sum of the suffix n (n=0, 45, 90, 135) indicating the edge angle, and a_edge_n_0 (n=0, 45, 90, 135) and a_edge_n_1 (n=0, 45, 90, 135) are coefficients corresponding to the filter base b_edge_n_0 (n=0, 45, 90, 135) and the filter base b_edge_n_1 (n=0, 45, 90, 135), respectively.

The filter section 110 determines the component w(K) of the fixed coefficient vector, the coefficient a_edge_n_0 (n=0, 45, 90, 135), and coefficient a_edge_n_1 (n=0, 45, 90, 135) per slice or per frame, for example, the aforementioned statistical approach.

The values of the control variables v_edge_n (n=0, 45, 90, 135) of the control variable determining section 120 are set by the same method described above. Moreover, the filter section 110 performs the filtering base on the filer coefficient vector V using the control variable v_edge_n (n=0, 45, 90, 135) supplied from the control variable determining section 120.

With this configuration, the adaptive filter 100 can perform the filtering by using different filter coefficient depending on the edge angle of edges in the target area T. Thus, it is possible to perform effective filtering for slices or frames having various edge angles.

Moreover, with this configuration, the filter base b_edge_n_0 (n=0, 45, 90, 135), and the filter base b_edge_n_1 (n=0, 45, 90, 135) each have base a component having an edge-stress effect to a direction orthogonal to the edge, the adaptive filter 100 having the above configuration can perform effective filtering not only for a direction parallel to the edge, but also for a direction orthogonal to the edge.

Again in case where the filtering coefficients are switched over according to the edge angle, it is also possible to perform filtering having luminance change due to the DC offset by using the filter base and filter coefficient, each of which corresponds to the DC offset.

Moreover, one specific example of the filter coefficient calculation process performed by the adaptive filter 100 in the present operation example is as follows. For example, assuming that the filter base b_edge_n is b_edge_90, w'(i) in the (preliminary step) of the aforementioned <Filter Coefficient Calculation Process> may be calculated out by the following Equation, and stored.

$$w'(4)=w(4)+a\_edge\_90 \times v\_edge\_90 \times b\_edge\_90(4)=w(4)+a\_edge\_90 \times v\_edge\_90 \times -1$$

$$w'(5)=w(5)+a\_edge\_90 \times v\_edge\_90 \times 2$$

$$w'(6)=w(6)+a\_edge\_90 \times v\_edge\_90 \times -1$$

For the other steps in the <Filter Coefficient Calculation Process>, the control variable v_skip should be read as the control variable v_edge_90. Moreover, the equation should be read in the similar manner in case where the filter base b_edge_n is another base. Moreover, Equation (14) can be easily generalized in case n is summed.

(Example in which the Filter Coefficient is Switched Over According to Luminance)

Next, an example in which the filter coefficient is switched over according to an average of luminance in the image in the filter target area T in the image data #100 is described. Here, the average of luminance in the filter target area T is an average of luminance values of pixels included in the filter target area T. Moreover, the luminance values of the pixels can be obtained as a function of the pixel values of the pixels.

The control variable determining section 120 sets a control variable v_lum to 0, 1, or 2 according to the average of luminance in the image in the filter target area T, and outputs the control variable v_lum to the filter section 110.

Moreover, the control variable determining section 120 outputs, to the filter section 110, the filter base b_lum associated with the average luminance of the image in the filter target area T. The filter base b_lum may be, for example, the edge-stress filter base or its linear sum (or its weighted linear sum).

The filter section 110 determines, with reference to the teacher data #200, the coefficients of the filter coefficient vector V having the components v (K) expressed by Equation (16).

$$v(K)=w(K)+a\_lum \times v\_lum \times b\_lum(K) \quad (16)$$

where a_lum is a coefficient (fixed coefficient) corresponding to the filter base b_lum.

The filter section 110 determines the components w(K) of the fixed coefficient vector and the coefficient a_lum per slice or per frame, for example, by the aforementioned statistical approach.

The control variable determining section 120 calculates out the average of the luminance values associated with the pixels included in the area, for every filter target area T. The control variable determining section 120 sets the value of the control variable v_lum to 2, for example when the average is less than 48. The control variable determining section 120 sets the value of the control variable v_lum to 1, for example when the average is not less than 48 but less than 96. The control variable determining section 120 sets the value of the control variable v_lum to 0, for example when the average is not less than 96. Here, it is assumed that the average can be in a range of 0 to 255.

Moreover, the control variable determining section 120 outputs the control variable v_lum to the filter section 110 per filter target area T.

The filter section 110 performs the filtering based on the filter coefficient vector V using the control variable v_lum supplied from the control variable determining section 120 for every filter target area T.

With this configuration, it is possible to perform filtering having a more intensive blurring when the average of the luminance values of the pixels included in the filter target area T is low, whereas it is possible to perform filtering having a weaker blurring when the average of the luminance values of the pixels included in the filter target area T is high.

Again in case where the filtering coefficients are switched over according to the luminance, it is also possible to perform filtering having luminance change due to the DC offset by using the filter base and filter coefficient, each of which corresponds to the DC offset.

Moreover, one specific example of the filter coefficient calculation process performed by the adaptive filter 100 in the present operation example is as follows. For example, assuming that the filter base b_lum is a widthwise direction edge-stress base, w'(i) in the (preliminary step) of the aforementioned <Filter Coefficient Calculation Process> may be calculated out by the following Equation, and stored.

$$w'(4) = w(4) + a\_lum \times v\_lum \times b\_lum(4)$$
$$= w(4) + a\_lum \times v\_lum \times -1$$
$$w'(5) = w(5) + a\_lum \times v\_lum \times 2$$
$$w'(6) = w(6) + a\_lum \times v\_lum \times -1$$

For the other steps in the <Filter Coefficient Calculation Process>, the control variable v_skip should be read as the control variable v_lum. Moreover, the equation should be read in the similar manner in case where the filter base b_lum is another base.

(Example in which the Filtering Coefficient is Switched Over According to Color)

Next, an example in which the filter coefficient is switched over according to colors in the images in the filter target area T in the image data #100 is described. Especially, an example whether or not the filter coefficient is switched over according to whether or not the colors in the pixels in the filter target area T are skin colors or not. Here, the case where the colors in the pixels in the filter target area T are skin colors is for example, an average of the colors included in the filter target area T is $133 \leq V \leq 177$, and $77 \leq U \leq 127$, and $60 \leq Y \leq 145$ according YUV component expression. Here, Y indicates a size of the brightness component, U is a size of a color component defined by a product of a constant and a difference between a blue component and the luminance component, and V is a size of a color component defined by a product of a constant and a difference between a red component and the luminance component. In the above example, Y, U, and V are in a range of 0 to 255.

The control variable determining section 120 sets the control variable v_skin to 1 according to whether the pixel at coordinates (x, y) in the image data #100 is in a skin color, wherein the control variable v_skin can be 0 or 1. The control variable determining section 120 outputs the control variable v_skin to the filter section 110.

The control variable determining section 120 outputs, to the filter section 110, the filter base b_skin associated with whether or not the pixel at coordinates (x, y) in the image data #100 is in a skin color. The filter base b_skin may be, for example, the aforementioned edge-stress filter base or its linear sum (or weighted linear sum).

The filter section 110 determines, with reference to the teach data #200, the coefficients of the filter coefficient vector V having the components v(K) expressed by Equation (17).

$$v(K)=w(K)+a\_skin \times v\_skin \times b\_skin(K) \quad (17)$$

where a_skin is a coefficient (fixed coefficient) corresponding to the filter base b_skin.

The filter section 110 determines the components v(K) of the filter coefficient vector and the coefficient a_skin per slice or per frame, for example, by the aforementioned statistical approach.

The control variable determining section 120 determines whether or not the pixel at coordinate (x, y) in the image data #100 is in the skin color. More specifically, the control variable determining section 120 determines whether or not the color of the pixel at the coordinates (x, y) in the image data #100 is within the following ranges expressed by the YUV components: $133 \leq V \leq 177$, $77 \leq U \leq 127$, and $60 \leq Y \leq 145$.

Moreover, if the color of the pixel at the coordinates (x, y) in the image data #100 is within the ranges, the control variable v_skin is set to 1, and outputs the control variable v_skin to the filter section 110. On the other hand, if the color of the pixel at the coordinates (x, y) in the image data #100 is not within the ranges, the control variable v_skin is set to 0, and outputs the control variable v_skin to the filter section 110.

The filter section 110 performs the filtering per filter target area T based on the filter coefficient vector V using the control variable v_skin supplied from the control variable determining section 120.

With this configuration, when the color of the pixel at the coordinates (x, y) in the image data #100 is within the ranges, it is possible to perform filtering having blurring effect, whereas if the color of the pixel at the coordinates (x, y) in the image data #100 is not within the ranges, it is possible to perform filtering having no blurring effect.

Again in case where the filtering coefficients are switched over according to the color, it is also possible to perform filtering having luminance change due to the DC offset by using the filter base and filter coefficient, each of which corresponds to the DC offset.

Moreover, one specific example of the filter coefficient calculation process performed by the adaptive filter 100 in the present operation example is as follows. For example, assuming that the filter base b_skip_n is a widthwise direction edge-stress base, w'(i) in the (preliminary step) of the aforementioned <Filter Coefficient Calculation Process> may be calculated out by the following Equation, and stored.

$$w'(4) = w(4) + a\_skin \times v\_skin \times b\_skin(4)$$
$$= w(4) + a\_skin \times v\_skin \times -1$$
$$w'(5) = w(5) + a\_skin \times v\_skin \times 2$$
$$w'(6) = w(6) + a\_skin \times v\_skin \times -1$$

For the other steps in the <Filter Coefficient Calculation Process>, the control variable v_skip should be read as the control variable v_skin. Moreover, the equation should be read in the similar manner in case where the filter base b_skin is another base.

(Example in which the Filter Coefficient is Switched Over According to Whether or not there is a Block Border)

Next, an example in which the filter coefficient is switched over according to whether or not there is a block border in the filter target region T is described.

The block is, for example, a unit of a change or a unit of motion compensation in the H.264/AC standard. In general, there is tendency that a block noise easily occurs at the block border.

The control variable determining section 120 sets the value of the control variable v_block to 1, wherein the value of the control variable v_block may be 0 or 1 according to whether or not the filter target area T contains a block border therein. Then, the control variable determining section 120 outputs the control variable v_block to the filter section 110.

The control variable determining section 120 outputs to the filter section 110 a filter base b_block associated with whether or not the filter target area T contains a block border. The filter base b_block may be, for example, the edge-stress filter base or its linear sum (or weighted linear sum).

The filter section 110 determines, with reference to the teacher data #200, the filter coefficient vector V having the components v(K) expressed by the following Equation (18).

$$v(K)=w(K)+a\_block \times v\_block \times b\_block(K) \quad (18)$$

where a_block is a coefficient (fixed coefficient) corresponding to the filter base b_block.

The filter section 110 determines the components w(K) of the fixed coefficient vector and the coefficient a_block per slice or per frame, for example, by the aforementioned statistical approach.

The control variable determining section 120 determines whether or not the filter target area T contains a block border. If the filter target area T contains a block border, the control variable determining section 120 sets the value of the control variable v_block to 1. If not, the control variable determining section 120 sets the value of control variable v_block to 0. Moreover, the control variable determining section 120 outputs the control variable v_block to the filter section 110.

For every filter target area T, the filter section 110 performs the filtering based on the filter coefficient vector V using the control variable v_block supplied from the control variable determining section 120.

With this configuration, it is possible to perform the filtering having a blurring effect for a filter target area T if it contains a block border, whereas it is possible to perform the filtering having no blurring effect for a filter target area T if it does not contain a block border.

Again in case where the filtering coefficients are switched over according to whether the filter target area T contains a block border, it is also possible to perform filtering having luminance change due to the DC offset by using the filter base and filter coefficient, each of which corresponds to the DC offset.

Moreover, one specific example of the filter coefficient calculation process performed by the adaptive filter 100 in the present operation example is as follows. For example, assuming that the filter base b_block is a widthwise direction edge-stress base, w'(i) in the (preliminary step) of the aforementioned <Filter Coefficient Calculation Process> may be calculated out by the following Equation, and stored.

$$w'(4) = w(4) + a\_block \times v\_block \times b\_block(4)$$
$$= w(4) + a\_block \times v\_block \times -1$$
$$w'(5) = w(5) + a\_block \times v\_block \times 2$$
$$w'(6) = w(6) + a\_block \times v\_block \times -1$$

For the other steps in the <Filter Coefficient Calculation Process>, the control variable v_skip should be read as the control variable v_block. Moreover, the equation should be read in the similar manner in case where the filter base b_block is another base.

(Example in which the Filter Coefficient is Switched Over According to Prediction Direction)

Next an example in which the filter coefficient is switched over according to side information associated with a block to which a pixel at coordinates (x, y) in the image data #100 belongs is described. Especially, an example in which the filter coefficient is switched over according to the block to which the pixel at coordinates (x, y) in the image data #100 belongs is a block generated according to a unidirectional prediction or bidirectional prediction under the H.264/AC standard.

Here, the unidirectional prediction under the H.264/AC standard is a case where the prediction of a block is carried out by using one frame encoded or decoded before a frame the block belongs. The bidirectional prediction under the H.264/AC standard is a case where the prediction of a block is carried out by using two frames encoded or decoded before a frame the block belongs. The number of frames used for the prediction is one or two in general, but may be greater than one or two.

The control variable determining section 120 sets the value of the control variable v_pred to 1, wherein the value of the control variable v_pred is set to 0 or 1 according to whether the block to which the pixel at coordinates (x, y) in the image data #100 is a block generated based on the unidirectional prediction or a block generated based on the bidirectional prediction. Then, the control variable determining section 120 outputs the control variable v_pred to the filter section 110.

Moreover, the control variable determining section 120 outputs to the filter section 110 a filter base b_pred associated with whether the block to which the pixel at coordinates (x, y) in the image data #100 is a block generated based on the unidirectional prediction or a block generated based on the bidirectional prediction. The filer base b_pred may be for example, the edge-stress filter base or its linear sum (or weighted linear sum).

The filter section 110 determines, with reference to the teacher data #20, the coefficients of the filter coefficient vector V having the components v(K) expressed by the following equation (19).

$$v(K)=w(K)+a\_pred \times v\_pred \times b\_pred(K) \quad (19)$$

where a_pred is a coefficient (fixed coefficient) corresponding to the filter base b_pred.

The filter section 110 determines the components w(K) of the fixed coefficient vector and the coefficient a_pred per slice or per frame, for example by the aforementioned statistical approach.

The control variable determining section 120 sets the control variable v_pred to 0 if the block to which the pixel at the coordinates (x, y) in the image data #100 is a block generated based on the unidirectional prediction, whereas The control variable determining section 120 sets the control variable v_pred to 1 if the block to which the pixel at the coordinates (x, y) in the image data #100 is a block generated based on the bidirectional prediction. Moreover, the control variable determining section 120 outputs the control variable v_pred to the filter section 110.

For every filter target area T, the filter section 110 performs the filtering based on the filter coefficient vector V using the control variable v_pred supplied from the control variable determining section 120.

With this configuration, it is possible to perform filtering having no edge-stress or blurring effect for a block, if the block to which the pixel at the coordinates (x, y) of the image data #100 belongs is one generated under the unidirectional prediction, whereas it is possible to perform filtering having the edge stress or blurring effect for a block, if the block to which the pixel at the coordinates (x, y) of the image data #100 belongs is one generated under the bidirectional prediction.

Again in case where the filtering coefficients are switched over according to whether the unidirectional prediction or the bidirectional prediction is performed as described above, it is also possible to perform filtering having luminance change due to the DC offset by using the filter base and filter coefficient, each of which corresponds to the DC offset.

Moreover, in case where a plurality of blocks are contained in the filter target area T, it may be so configured that information assigned to any one of the blocks is used.

Moreover, one specific example of the filter coefficient calculation process performed by the adaptive filter 100 in the present operation example is as follows. For example, assuming that the filter base b_pred is a widthwise direction edge-stress base, w'(i) in the (preliminary step) of the aforementioned <Filter Coefficient Calculation Process> may be calculated out by the following Equation, and stored.

$$w'(4) = w(4) + a\_pred \times v\_pred \times b\_pred(4)$$
$$= w(4) + a\_pred \times v\_pred \times -1$$
$$w'(5) = w(5) + a\_pred \times v\_pred \times 2$$
$$w'(6) = w(6) + a\_pred \times v\_pred \times -1$$

For the other steps in the <Filter Coefficient Calculation Process>, the control variable v_skip should be read as the control variable v_pred. Moreover, the equation should be read in the similar manner in case where the filter base b_pred is another base.

(Example in which the Filter Coefficient is Switched Over According to the Prediction Method)

Next, an example in which a block to which a pixel at coordinates (x, y) in the image data #100 belongs is a block predicted by intra prediction under the H.264/AV standard, or a block predicted by inter prediction under the H.264/AV standard, is described below.

The control variable determining section 120 sets a value of a control variable v_int to 1, wherein the value of the control variable v_int is set to 0 or 1 according to whether the block to which the pixel at coordinates (x, y) in the image data #100 belongs is a block predicted by intra prediction or a block predicted by inter prediction. Then, the control variable determining section 120 outputs the control variable v_int o the filter section 110.

The control variable determining section 120 outputs to the output section 110 a filter base b_int associated whether the block to which the pixel at coordinates (x, y) in the image data #100 belongs is a block predicted by intra prediction or a block predicted by inter prediction. The filter base b_int may be, for example, the edge stress filter base or its linear sum (or weighted linear sum).

The filter section 110 determines, with reference to the teacher data #200, the coefficients of the filer coefficient vector V having the components expressed by the following Equation (20).

$$v(K)=w(K)+a\_int \times v\_int \times b\_int(K) \quad (20)$$

where a_int is a coefficient (fixed coefficient) corresponding to the filter base b_int.

The filter section 110 determines the components w(K) of the fixed coefficient vector and the coefficient a_int per slice or per frame, for example by the aforementioned statistical approach.

If the block to which the pixel at the coordinates (x, y) in the image data #100 belongs is one predicted by the intra prediction, the control variable determining section 120 sets the value of the control variable v_int to 1 for the block, whereas if the block to which the pixel at the coordinates (x, y) in the image data #100 belongs is one predicted by the inter prediction, the control variable determining section 120 sets the value of the control variable v_int to 0 for the block. Then the control variable determining section 120 outputs the control variable v_into to the filter section 110.

For every filer target area T, the filter section 110 performs the filtering based on the filter coefficient vector V using the control variable v_pred supplied from the control variable determining section 120.

In general, edges in the block predicted by the intra prediction tends to be easily blurred.

With this configuration, it is possible to perform the filtering in such a way that if the block to which the pixel at the coordinates (x, y) in the image data #100 is one predicted by the intra prediction, the filtering having the edge-stress effect is performed, whereas if the block to which the pixel at the coordinates (x, y) in the image data #100 is one predicted by the inter prediction, the filtering having no edge-stress effect is performed. Therefore, with this configuration, it is possible to perform effective filtering for the block to which the pixel at the coordinates (x, y) in the image data #100, regardless of whether the block is one predicted by the intra prediction or one predicted by the inter prediction.

Again in case where the filtering coefficients are switched over according to whether the inter prediction or the intra prediction is performed as described above, it is also possible to perform filtering having luminance change due to the DC offset by using the filter base and filter coefficient, each of which corresponds to the DC offset.

Moreover, in case where a plurality of blocks are contained in the filter target area T, it may be so configured that information assigned to any one of the blocks is used.

Moreover, one specific example of the filter coefficient calculation process performed by the adaptive filter 100 in the present operation example is as follows. For example, assuming that the filter base b_int is a widthwise direction edge-stress base, w'(i) in the (preliminary step) of the aforementioned <Filter Coefficient Calculation Process> may be calculated out by the following Equation, and stored.

$$w'(4) = w(4) + a\_int \times v\_int \times b\_int(4)$$
$$= w(4) + a\_int \times v\_int \times -1$$
$$w'(5) = w(5) + a\_int \times v\_int \times 2$$
$$w'(6) = w(6) + a\_int \times v\_int \times -1$$

For the other steps in the <Filter Coefficient Calculation Process>, the control variable v_skip should be read as the control variable v_int. Moreover, the equation should be read in the similar manner in case where the filter base b_int is another base.

(Example in which the Filter Coefficient is Switched Over According to a Distance from a Block Border)

Next, an example in which the filter coefficient is switched over according to a distance between a pixel at coordinates (x, y) in the image data #100, and a block border of a block to which the pixel belongs.

The control variable determining section 120 sets a value of a control variable v_dist to 1, wherein the value of the control variable v_dist is 0 or 1 according to a distance between a pixel at coordinates (x, y) in the image data #100, and a block border of a block to which the pixel belongs. Then, the control variable determining section 120 outputs the control variable v_dist to the filter section 110.

Moreover, the control variable determining section 120 outputs to the filter section 110, a filter base b_dist associated with the distance between the pixel at the pixel at the coordinates (x, y) in the image data #100, and the block border of the block to which the pixel belongs.

The filter section 110 determines, with reference to the teacher data #200, the coefficients of the filter coefficient vector V having the components v(K) expressed by the following Equation (21).

$$v(K) = w(K) + a\_dist \times v\_dist \times b\_dist(K) \quad (21)$$

where a_dist is a coefficient (fixed coefficient) corresponding to the filter base b_dist.

The filter section 110 determines the components w(K) of the fixed coefficient vector and the coefficient a_dist per slice or per frame, for example by the aforementioned statistical approach.

The control variable determining section 120 calculates out the distance between the pixel at the coordinates (x, y) in the image data #100, and the block border of the block to which the pixel belongs. If the distance is smaller than a predetermined first threshold, the control variable determining section 120 sets the control variable v_dist to 2. Ff the distance is not less than the first threshold but less than a second threshold greater than the first threshold, the control variable determining section 120 sets the control variable v_dist to 1. If the distance is not les than the second threshold, the control variable determining section 120 sets the control variable v_dist to 0. Moreover, the control variable determining section 120 outputs the control variable v_dist to the filter section 110.

For every filter target area T, the filter section 110 performs the filtering based on the filter coefficient vector V using the control variable v_dist supplied from the control variable determining section 120.

With this configuration, it is possible to perform three-leveled filtering having different edge-stress effect according to the distance between the pixel at the coordinates (x,y) in the image data #100 and the block border of the block to which the pixel belongs. That is, if the distance between the pixel and the block border is smaller than the first threshold, filtering having the greatest edge-stress effect among the three-leveled filtering is performed. If the distance is not less than the first threshold but less than the second threshold, the filtering having the second greatest edge-effect among the three-leveled filtering is performed. If the distance is not less than the second threshold, the filtering having no edge-stress effect is performed.

Again in case where the filtering coefficients are switched over according to the distance from the block border, it is also possible to perform filtering having luminance change due to the DC offset by using the filter base and filter coefficient, each of which corresponds to the DC offset.

Moreover, it may be configured that the filter base is changed according to whether the block border is a vertical border or a horizontal border. That is, it may be configured such that if the block border is a vertical border, the filter coefficient b_dist is the horizontal edge-stress base, and if the block border is a horizontal border, the filter coefficient b_dist is a vertical edge-stress base.

Moreover, the control vertical determining section 120 may be configured to output a control variable adjusted according to a distance from a vertical block border and a control variable adjusted according to a distance from a horizontal block border, thereby being able to perform filtering having different edge-stress effect, according to the distance from the vertical block border and the distance from the horizontal block border.

Moreover, one specific example of the filter coefficient calculation process performed by the adaptive filter 100 in the present operation example is as follows. For example, assuming that the filter base b_dist is a widthwise direction edge-stress base, w'(i) in the (preliminary step) of the aforementioned <Filter Coefficient Calculation Process> may be calculated out by the following Equation, and stored.

$$w'(4) = w(4) + a\_dist \times v\_dist \times b\_dist(4)$$
$$= w(4) + a\_dist \times v\_dist \times -1$$
$$w'(5) = w(5) + a\_dist \times v\_dist \times 2$$
$$w'(6) = w(6) + a\_dist \times v\_dist \times -1$$

For the other steps in the <Filter Coefficient Calculation Process>, the control variable v_skip should be read as the control variable v_dist. Moreover, the equation should be read in the similar manner in case where the filter base b_dist is another base.

(Example in which the Filter Coefficient is Switched Over According to a Position in a Frame)

Next, an example in which the filter coefficient is switched over according to where a pixel at coordinates (x, y) in the image data #100 is located in a frame is described.

The control variable determining section 120 sets a value of a control variable v_xy to 1, wherein the control variable v_xy is 0 or 1 according to where a pixel at coordinates (x, y) in the image data #100 is located in a frame. Then, the control variable determining section 120 outputs the control variable v_xy to the output filter section 110.

Moreover, the control variable determining section 120 outputs, to the filter section 110, a filter base b_xy associated to the position where the pixel at the coordinates (x,y) in the image data #100 is located in the frame. The filter base b_xy may be, for example, the edge-stress base or the DC offset base.

The filter section 110 determines, with reference to the teacher data #200, the coefficients of the filter coefficient vector V having the components v(K) expressed by the following Equation (22).

$$v(K)=w(K)+a\_xy \times v\_xy \times b\_xy(K) \quad (22)$$

where a_xy is a coefficient (fixed coefficient) corresponding to the base filter b_xy.

The filter section 110 determines the components w(K) of the fixed coefficient vector and the coefficient a_xy per slice or per frame, for example by the aforementioned statistical approach.

The control variable determining section 120 sets the control variable v_xy to 1 if the pixel at the coordinates (x, y) in the image data #100 is located in an upper half of the frame, whereas the control variable determining section 120 sets the control variable v_xy to o if the pixel at the coordinates (x, y) in the image data #100 is located in a lower half of the frame. Moreover, the control variable determining section 120 outputs the control variable v_xy to the filter section 110.

For every filter target area T, the filter section 110 performs filtering based on the filter coefficient vector V using the control variable v_xy supplied from the control variable determining section 120.

With this configuration, it is possible to perform such filtering that filtering having a DC offset effect is performed for the upper half of the frame and filtering having no DC offset effect is performed for the lower half of the frame.

It should be noted that the present invention is not limited to the above-described example in which the filter base b_xy is a DC offset base. The filter base b_xy may be the edge-stress base described above.

Moreover, one specific example of the filter coefficient calculation process performed by the adaptive filter 100 in the present operation example is as follows. For example, assuming that the filter base b_xy is a widthwise direction edge-stress base, w'(i) in the (preliminary step) of the aforementioned <Filter Coefficient Calculation Process> may be calculated out by the following Equation, and stored.

$$w'(4) = w(4) + a\_xy \times v\_xy \times b\_xy(4)$$
$$= w(4) + a\_xy \times v\_xy \times -1$$
$$w'(5) = w(5) + a\_xy \times v\_xy \times 2$$
$$w'(6) = w(6) + a\_xy \times v\_xy \times -1$$

For the other steps in the <Filter Coefficient Calculation Process>, the control variable v_skip should be read as the control variable v_xy. Moreover, the equation should be read in the similar manner in case where the filter base b_xy is another base.

(Example in which the Filter Coefficient is Switched Over According to a Size of Quantized Parameter)

Next, an example in which the filter coefficient is switched over according to a quantized parameter QP associated with a block to which a pixel at coordinates (x, y) in the image data #100.

Here, the quantized parameter QP is a parameter associated with a quantizing step for example in MPEG-2 and the H.264/AVC standard, and assigned to every block individually.

The control variable determining section 120 sets a control variable v_qp to 1 wherein the control variable v_qp is 0 or 1 according to the size of a quantized parameter associated to a block to which a pixel at coordinates (x, y) in the image data #100. Then the control variable determining section 120 outputs the control variable v_qp to the filter section 110.

Moreover, the control variable determining section 120 outputs, to the filter section 110, a filter base b_qp associated with a size of the quantized parameter QP associated with the block to which the pixel at the coordinates (x, y) in the image data #100 belongs. The filter base b_qp may be, for example, the edge-stress base.

The filter section 110 determines, with reference to teacher data #200, the coefficients of the filter coefficient vector V having the components v(K) expressed by the following Equation (23).

$$v(K)=w(K)+a\_qp \times v\_qp \times b\_qp(K) \quad (23)$$

where a_qp is a coefficient (fixed coefficient) corresponding to the filter base b_qp.

The filter section 110 determines the components w(K) of the fixed coefficient vector and the coefficient a_qp per slice or per frame by for example the aforementioned statistical approach.

The control variable determining section 120 sets the control variable qp to 1 when a value of the quantized parameter QP associated with the block to which the pixel at the coordinate (x, y) in the image data #100 is equal to or greater than the predetermined threshold, whereas the control variable determining section 120 sets the control variable qp to 0 when a value of the quantized parameter QP associated with the block to which the pixel at the coordinate (x, y) in the image data #100 is smaller than the predetermined threshold. Moreover, the control variable determining section 120 outputs the control variable v_qp to the filter section 110.

For every filter target area T, the filter section 110 performs filtering based on the filter coefficient vector V using the control variable v_qp supplied from the control variable determining section 120.

In general, a block associated with a greater quantized parameter QP tends to have blurring easily.

With this configuration, it is possible to perform such filtering that if the quantized parameter QP is equal to or greater than the threshold, filtering having a blurring effect is performed, whereas if the quantized parameter QP is less than the threshold, filtering having no blurring effect is performed.

Therefore, with this configuration, it is possible to perform effective filtering even if the image data #100 includes quantized parameters of various values.

Again in the case where the filter coefficient is switched over according to the quantized parameter QP as described above, it is possible to perform filtering having luminance change due to the DC offset by using a filter base and a filter coefficient, each of which corresponds to the DC offset.

Moreover, in case where a plurality of blocks are contained in the filter target area T, it may be so configured that information assigned to any one of the blocks is used.

Moreover, one specific example of the filter coefficient calculation process performed by the adaptive filter 100 in the present operation example is as follows. For example, assuming that the filter base b_qp is a widthwise direction edge-stress base, w'(i) in the (preliminary step) of the aforementioned <Filter Coefficient Calculation Process> may be calculated out by the following Equation, and stored.

$$w'(4) = w(4) + a\_qp \times v\_qp \times b\_qp(4)$$
$$= w(4) + a\_qp \times v\_qp \times -1$$
$$w'(5) = w(5) + a\_qp \times v\_qp \times 2$$
$$w'(6) = w(6) + a\_qp \times v\_qp \times -1$$

For the other steps in the <Filter Coefficient Calculation Process>, the control variable v_skip should be read as the control variable v_qp. Moreover, the equation should be read in the similar manner in case where the filter base b_qp is another base.

(Example in which the Filter Coefficient is Switched Over According to a Size of the DC Component)

Next, an example in which the filter coefficient is switched over according to a size of the DC component associated with a block to which a pixel at coordinates (x, y) in the image data #100 belongs.

Here, the DC component is, for example, a coefficient corresponding to a direct current component among the coefficient after frequency transformation to the pixel values included in the block under the H.264/AVC standard.

The control variable determining section 120 sets a value of a control variable v_dc' to 1, wherein the control variable v_dc' is 0 or 1 according to the size of the DC component associated with the block to which the pixel at coordinates (x, y) in the image data #100 belongs.

Moreover, the control variable determining section 120 outputs, to the filter section 110, a filter base b_dc' associated with the size of the DC component associated with the block to which the pixel at the coordinates (x, y) in the image data #100 belongs. The filter base b_dc' may be, for example, the aforementioned edge-stress base.

The filter section 110 determines, with reference to the teacher data #200, the coefficients of the filter coefficients vector V having the components v(K) expressed by the following Equation (24).

$$v(K)=w(K)+a\_dc'\times v\_dc'\times b\_dc'(K) \quad (24)$$

where a_dc' is a coefficient (fixed coefficient) corresponding to the filter base b_dc'.

The filter section 110 determines the components w(K9 of the fixed coefficient vector, and the coefficients a_dc' per slice or per frame, for example by the aforementioned statistical approach.

The control variable determining section 120 sets the value of the control variable v_dc' to 0 when the value of the DC component associated with the block to which the pixel at the coordinates (x, y) in the image data #100 is equal to or greater than a predetermined threshold, whereas the control variable determining section 120 sets the value of the control variable v_dc' to 1 when the value of the DC component is less than the threshold. Moreover, the control variable determining section 120 outputs the control variable v_dc' to the filter section 110.

For every filter target area T, the filter section 110 performs filtering based on the filter coefficient vector V using the control variable v_dc' supplied from the control variable determining section 120.

In general, a block associated with a smaller DC components tends to have blurring easily.

With this configuration, it is possible to perform such filtering that filtering having a blurring effect is performed when the value of the DC component is smaller than the threshold value, whereas filtering having no blurring effect is performed when the value of the DC component is equal to or greater than the threshold value.

Therefore, with this configuration, it is possible to perform effective filtering even if the image of the image data #100 is constituted from blocks having various DC components.

Again in the case where the filter coefficient is switched over according to the value of the DC parameter as described above, it is also possible to perform the filtering having the luminance change effect due to the DC offset, by using the filter base and the filter coefficient, each of which corresponds to the DC offset.

Moreover, in case where a plurality of blocks are contained in the filter target area T, it may be so configured that information assigned to any one of the blocks is used.

Moreover, one specific example of the filter coefficient calculation process performed by the adaptive filter 100 in the present operation example is as follows. For example, assuming that the filter base b_dc is a widthwise direction edge-stress base, w'(i) in the (preliminary step) of the aforementioned <Filter Coefficient Calculation Process> may be calculated out by the following Equation, and stored.

$$w'(4) = w(4) + a\_dc' \times v\_dc' \times b\_dc'(4)$$
$$= w(4) + a\_dc' \times v\_dc' \times -1$$
$$w'(5) = w(5) + a\_dc' \times v\_dc' \times 2$$
$$w'(6) = w(6) + a\_dc' \times v\_dc' \times -1$$

For the other steps in the <Filter Coefficient Calculation Process>, the control variable v_skip should be read as the control variable v_dc'. Moreover, the equation should be read in the similar manner in case where the filter base b_dc' is another base.

(Example in which the Filter Coefficient is Switched Over According to a Size of Motion Vector)

Next, an in which the filter coefficient is switched over according to a size of motion vector associated with a block to which a pixel at coordinates (x, y) in the image data #100 belongs.

Here, the motion vector is, for example, a motion vector for use for inter-frame prediction under H.264/AVC.

The control variable determining section 120 sets a value of a control variable v_mv to 1, wherein the control variable v_mv is 0 or 1 according to the size of the vector associated with the block to which the pixel at the coordinates (x, y) in the image data #100 belongs. Then, the control variable determining section 120 outputs the control variable v_mv to the filter section 110.

Moreover, the control variable determining section 120 outputs, to the filter section 110, a filter base b_mv associated with a size of the motion vector associated with the block to which the pixel at the coordinates (x, y) in the image data #100 belongs. The filter base b_mv may be, for example, the edge-stress base.

The filter section 110 determines, with reference to the teacher data #200, the coefficients of the filter coefficient vector V having the components v(K) expressed by the following Equation (25).

$$(K) = w(K) + a\_mv \times v\_mv \times b\_mv(K) \quad (25)$$

where a_mv is a coefficient (fixed coefficient) corresponding to the filter base b_mv.

The filter section 110 determines the components w(K) of the fixed coefficient vector and the coefficient a_mv per slice or per frame by, for example, the aforementioned statistical approach.

The control variable determining section 120 sets the value of the control variable v_mv to 1 when the size of the motion vector associated with the block to which the pixel at the coordinates (x, y) in the image data #100 belongs is equal to or greater than a predetermined threshold, whereas the control variable determining section 120 sets the value of the control variable v_mv to I when the size of the motion vector is less than the threshold. Moreover, the control variable determining section 120 outputs the control variable v_mv to the filter section 110.

For every filter target area T, the filter section 110 performs the filtering based on the filter coefficient vector V using the control variable v_mv supplied from the control variable determining section 120.

In general, a block associated with a greater motion vector tend to have blurring easily.

With this configuration, the filtering can be performed such that filtering having a blurring effect is performed when the size of the motion vector is equal to or greater than the threshold value, whereas filtering having no blurring effect is performed when the size of the motion vector is less than the threshold value.

Therefore, with this configuration, it is possible to perform effective filtering even if the image of the image data #100 is constituted from blocks associated with motion vectors having various sizes.

In the case where the filter coefficient is switched over according to the size of the motion vector as described above, it is also possible to perform the filtering having the luminance change effect due to the DC offset, by using a filter base and filter coefficient, each of which corresponds to the DC offset described above.

Moreover, in case where a plurality of blocks are contained in the filter target area T, it may be so configured that information assigned to any one of the blocks is used.

Moreover, it may be so configured that the filter coefficient is switched over according to the size of a differential motion vector, instead of the size of the motion vector, wherein the differential motion vector is a difference between the motion vector and a predicted vector.

So far, the examples of switching over the filter coefficients by the adaptive filter 100 according to the present embodiment. It should be noted that the present invention is not limited to the examples mentioned above. For example, the present invention encompasses cases where the filter coefficient is switched over in a way in which the above examples are combined as appropriate. That is, the control variable determining section 120 may be configured to output some of the control variables and some corresponding ones of the control bases, which are described above. With such a configuration, it is possible to perform more effective filtering.

Moreover, one specific example of the filter coefficient calculating process performed by the adaptive filter 100 in the present operation example is as follows. For example, assuming that the filter base b_mv is a horizontal edge-stress base, w'(i) in the (preliminary step) of the aforementioned <Filter Coefficient Calculation Process> may be calculated out by the following Equation, and stored.

$$w'(4) = w(4) + a\_mv \times v\_mv \times b\_mv(4)$$
$$= w(4) + a\_mv \times v\_mv \times -1$$
$$w'(5) = w(5) + a\_mv \times v\_mv \times 2$$
$$w'(6) = w(6) + a\_mv \times v\_mv \times -1$$

For the other steps in the <Filter Coefficient Calculation Process>, the control variable v_skip should be read as the control variable v_mv. Moreover, the equation should be read in the similar manner in case where the filter base b_mv is another base.

Moreover, in case where the control variable determining section 120 outputs a plurality of control variables, it may be configured that the control variable determining section 120 determines a plurality of control variables whose contribution to the filtering is small, a new control variable is formed from a linear sum of the plurality of control variables whose contribution to the filtering is small, and the filter coefficient is switched over by switching over the value of the new control variable.

For example, in case a control variable v_0 and a control variable v_2 among control variables v_0, v_1, and v_2 make small contributions to the filtering, the control variable determining section 120 sets a new control variable v_02 where v_02=v_0+v_2, and switches over a value of the control variable v_02, so as to switch over the filter coefficient.

With this configuration, it is possible to reduce the number of the control variables whose contributions to the filtering are small. Thereby, it is possible to reduce calculation load in the adaptive filter 100.

The present invention is not limited to a particular method for determining which control variables are small in contribution to the filtering. For example, filtering is performed with different values for different control variables so as to find control variables with which a difference between a pixel value before the filtering and a pixel value after the filtering is small, and identify such control variables are control variables whose contribution to the filtering is small.

Moreover, the present invention is not limited to the above-explained examples in which the coefficient for the filter base outputted from the control variable determining section 120 is determine by the statistical approach.

For example, the control variable determining section 120 may be configured such that a filter base optimal for the coefficient determined by the statistical approach is determined.

Moreover, the step of calculating the coefficient for a fixed filter base and the step of determining a filter coefficient optimal for a fixed coefficient may be repeated so as to find the filter coefficient and the filter base, which are optimal for the image data #100.

So far, the adaptive filter 100 according to the present embodiment is explained.

In the following, a moving image encoding device and a moving image and a moving image decoding device and a moving image, each of which is provided with the adaptive filter 100, are described below as specific application examples of the adaptive filter 100, referring to FIGS. 5 to 9.

(Application Example to Moving Image Encoding Device)

To begin with, a moving image encoding device 1 provided with the adaptive filter 100 is described below, referring to FIG. 4.

The moving image encoding device 1 is a moving image encoding device in part of which the H.264/AV standard and a technique adopted in the KTA software are used.

Figure 5:
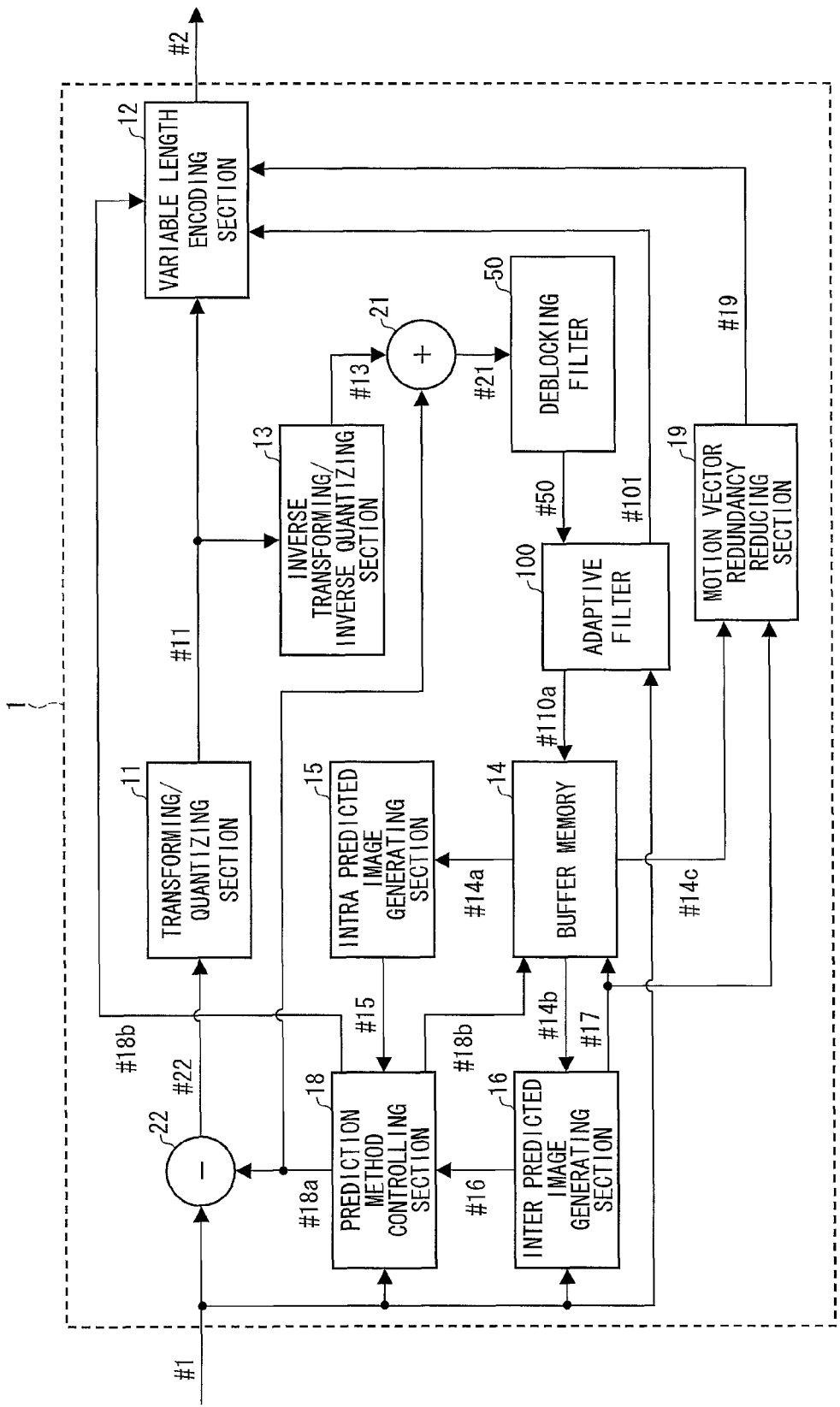
FIG. 5 is a block diagram illustrating a moving image encoding device including the adaptive filter according to the embodiment.

FIG. 5 is a block diagram illustrating a configuration of the moving image encoding device 1.

As illustrated in FIG. 5, the moving image encoding device 1 includes a transforming/quantizing section 11, a variable length encoding section 12, an inverse transforming/inverse quantizing section 13, a buffer memory 14, a intra predicted image generating section 15, an inter predicted image generating section 16, a prediction method controlling section 18, a motion vector redundancy reducing section 19, an adder 21, a subtractor 22, a deblocking filter 50, and the adaptive filter 100.

The moving image encoding device 1 receives an input image #1, which have been divided into block images (hereinafter, referred to as "macro blocks") constituted from adjacent pixels.

The moving image encoding device 1 encodes the input image #1, and outputs encoded data #2.

The transforming/quantizing section 11 performs DCT (Discrete Cosine Transform) transformation of differential image #22 between (i) the input image #1 divided into the macro blocks and (ii) predicted image #18 outputted from the later-described prediction method controlling section 18, thereby transforming the differential image #22 into frequency components. Then, the transforming/quantizing section 11 quantizes the frequency components, thereby generating quantized prediction residual data #11. Here, the quantization is calculation to associate the frequency component to integer value. Moreover, the DCT transformation and the quantization are performed per block obtained by dividing the macro blocks. In the following, the macro blocks to be subjected to the above treatment is referred to as "target macro blocks", and blocks to be subjected to the above treatment is referred to as "target blocks".

The inverse quantizing/inverse transforming section 13 decodes the quantized prediction residual data #11, thereby generating the prediction residual #13. More specifically, the inverse quantizing/inverse transforming section 13 performs inverse quantization of the quantized prediction residual data #11, (i.e., associating (i) the integral values constituting the quantized prediction residual data #11 to (ii) the frequency components) and inverse DCT transformation of the frequency component (i.e., inverse transformation of the target macro block into pixel components on the basis of the frequency components), thereby generating the prediction residual #13.

The adder 21 adds the prediction residual #13 and a predicted image #18a, thereby obtaining a decoded image #21. The decoded image #21 thus generated is supplied to the deblocking filter 50.

If a difference between pixel values of pixels adjacent with each other via a block border or via a macro block border in the decoded image #21 is smaller than a predetermined threshold, the deblocking filter 50 performs deblocking process to the block border or the macro block border in the decoded image #21. The image having been subjected to the deblocking is outputted as a deblocked image #50.

To the deblocked image #50, the adaptive filter 100 performs the filtering explained in the <Examples of Filtering Performed by the Adaptive Filter 100>. Then, the adaptive filter 100 outputs an output image data #110a to the buffer memory 14. In this explanation, the deblocked image #50 corresponds to the image data #100.

The adaptive filter 100 receives the input image #1, the decoded image #21, and side information associated with the decoded image #21. In this explanation, the input image #1 corresponds to the teacher data #200, and the side information corresponds to the side information #100a.

Moreover, the adaptive filter 100 outputs the filter coefficient information #101, which is information on the filter coefficient used in the filtering. In this explanation, the filter coefficient information #101 corresponds to the filter coefficient information #110b. That is, the filter coefficient information #101 includes the components w(K) of the fixed coefficient vector W, and the fixed coefficient used in the filtering. For example, in case where, as in the operation example described above, the adaptive filter 100 switches over the filter coefficient according to whether the skip mode is applied or not, the filter coefficient information #101 includes the components w(K) of the fixed coefficient vector W, and the fixed coefficient a_skip. The same is true for the other operation examples.

The adaptive filter 100 in the present application example corresponds to ALF (Adaptive Loop Filter) in KTA, substantially. That is, the adaptive filter 100 in the present application example receives a pixel value of a pixel at integer coordinates (hereinafter, the pixel is referred to as integer pixel), and outputs the pixel value of the integer pixel. This corresponds to a case where x, y, x and y' in Equation (1) are all integers.

The moving image encoding device 1 may be configured such that it does not include the deblocking filter 50. In this case, the adaptive filter 100 performs the filtering directly on the decoded image #21, not the deblocked image #50. Especially, in case where the control variable is whether the block border is contained or how much the distance from the block border is, the adaptive filter 100 can be able to reduce the block noise, like the deblocking filter. In such a case, the throughput can be reduced due to the elimination of the process performed by the deblocking filter 50. Further, by using an adaptive filter specialized as a deblocking filter, it is possible to obtain a greater effect than the use of a conventional deblocking filter (for example, it is possible to use a filter that changes its blurring effect according to the luminance value).

The moving image encoding device 1 may be configured to include (i) both of the deblocking filter and the adaptive filter, (ii) only the adaptive filter, but not the deblocking filter, or (iii) the adaptive filter serving as a deblocking filter, and the adaptive filter.

The intra predicted image generating section 15 extracts a local decoded image #14a (decoded area in the same frame of the target macro block) from the decoded image #21 stored in the buffer memory 14, and performs intra-frame prediction on the basis of the local decoded image #14a, thereby generating an intra predicted image #15.

The inter predicted image generating section 16 calculates a motion vector #17 by using a reference image #14b, whose whole frame has been decoded and which is stored in the buffer memory 14. Then, inter predicted image generating section 16 allocates the motion vector to the target block on the input image #1. The calculated motion vector #17 is outputted to the predicted image generating section 16 and the motion vector redundancy reducing section 19, and stored in the buffer memory 14. Moreover, the inter predicted image generating section 16 performs motion compensation with respect to the reference image on the basis of the motion vector #17 per block, thereby generating an inter predicted image #16.

The prediction method controlling section 18 compares the intra predicted image #15, the inter predicted image #16, and the input image "1 for every block, so as to select and output one of the intra predicted image #15 and the inter predicted image #16 as a predicted image #18. Moreover, the prediction method controlling section 18 also outputs a prediction mode #18b, which is information indicating which one of the intra predicted image #15 and the inter predicted image #16 is selected. The prediction image #18a is inputted in the subtractor 22.

The prediction mode #18b is stored in the buffer memory 14 and inputted in the variable length encoding section 12.

The motion vector redundancy reducing section 19 calculates out a predicted vector after the motion vector #17 is allotted to the target block by the inter predicted image generating section 1, the motion vector redundancy reducing section 19 calculating out the predicted vector based on a motion vector group 14c stored in the buffer memory 14, the motion vector group 14c having been allotted to other blocks than the target block to which the motion vector #17 is allotted by the inter predicted image generating section 16. Moreover, the motion vector redundancy reducing section 19 determines a difference between the predicted vector and the motion vector #17, thereby generating the differential motion vector #19. The differential motion vector #19 thus generated is supplied to the variable length encoding section 12.

The variable length encoding section 12 performs variable length encoding process to the quantized prediction residual data #11, the differential motion vector #19, the prediction mode #18b, and the coefficients included in the filter coefficient information #101, thereby generating the encoded data #2.

The subtractor 22 determines a difference between the input image #1 and the predicted image #18a for the target macro block, and outputs a differential image #22.

(Encoding of the Filter Coefficient Information #101)

Here, encoding of the filter coefficient information #101 is described specifically, referring to (a) to (c) of FIG. 6. (a) to (c) of FIG. 6 are views illustrating configurations of encoded data of the filter coefficient information #101.

The filter coefficient information #101 is filter coefficient itself or information necessary for calculating out the filter coefficient. For example, if the filter coefficient calculating equation F is Equation (9), The filter coefficient information #101 is the fixed coefficient vector wi the fixed coefficient akj. If the filter coefficient calculating equation F is Equation (6), the filter coefficient information #101 is w(i) where i=1 to 10, and a_skip.

In the example illustrated in (a) of FIG. 6, encoded data of the filer coefficient information #101 is constituted from the fixed filter parameter. The values of the filter coefficient information #101 have higher possibility to have values closer to 0, except a center element. Thus, the values of the filter coefficient information #101 are divided into signs and absolute values. The signs are encoded by 1 bit, and the absolute values are encoded by shorter codes as the absolute values are closer to 0. The method of encoding is not limited to this and arithmetic encoding may be adopted. The encoding is performed, considering that the center element has a value closer to 1.

Moreover, it is also appropriate to adopt encoding in which a predicted value of the filter coefficient information #101 is calculated out, and a difference (prediction difference) between the filter coefficient information #101 and the predicted value is encoded. The predicted value may be such that a predicted value for w(5) corresponding to a center is 0.8 and predicted values for w(i) around the center are 0.1, considering that a center value is closer to 1 and the other elements are closer to 0, for example. The prediction method is not limited to this.

As described above referring to FIG. 3, it is possible to divide the filter coefficient vector into components variable according to the control variable and components invariable according to the control variable. The encoding may be performed by utilizing this feature. (b) and (c) of FIG. 6 illustrates two examples of this encoding.

The example illustrated in (b) of FIG. 6, the encoded data is constituted from (1) filter coefficients regarding components invariable according to the control variable, and (2) filter coefficients regarding components variable according to the control variable, and being associated with the values of the control variables. In this example, the filter coefficient v(i) as such is encoded for the component invariable according to the control variable. As to the component variable according to the control variable, the filter coefficient v(i) where i=4, 5, 6 for the case where the control variable v_skip=0, and the filter coefficient v(i) where i=4, 5, 6 for the case where the control variable v_skip=1 are encoded.

In the example illustrated in (c) of FIG. 6, the encoded data includes (1) filter coefficients (hereinafter, referred to as basic coefficients) regarding various components invariable according to the control variables, and (2) differences between the basic coefficients and the filter coefficients regarding the components variable according to the control variables. In this example, to begin with, the filter coefficient vector V for control variable v_skip=0, v(i) where i=1 to 10. Next, for the elements variable according to the control variables among the elements of the filter coefficient vectors, differences dv'(i) where i=4, 5, 6 between the filter coefficients v(i) for the case where the control variable v_skip=0, and the filter coefficients v(i) for control variable v_skip=1 are encoded.

Again in the examples illustrated in (b) and (c) of FIG. 6, if the filter coefficients are symmetric (the bases are symmetric), it is possible to encode only one of the identical filter coefficients by being symmetric.

In the examples, there are three components variable according to the control variable v_skip. Thus, it is preferable to adopt the example in (a) of FIG. 6 rather than those in (b) and (c) of FIG. 6, because the example in (a) of FIG. 6, which encodes only the filter coefficient information (here, a_skip) regarding the control variable, encodes less number of the filter coefficient information than those in (b) and (c) of FIG. 6, in which each of the components variable and invariable according to the filter coefficients are encoded. However, if there is only one component variable according to the control variable, like in case where the DC offset base b_dc is used as the base corresponding to the control variable, the number of the filter coefficient information to be encoded is equal between the encoding each of the components variable and invariable according to the filter coefficients and the encoding only the filter coefficient information regarding the control variable.

As describe above, an encoding device (moving image encoding device 1) according to the present invention comprises the image filter (adaptive filter 100) and causes the image filter to process a decoded image.

The encoding device according to the present invention with the aforementioned configuration can process the decoded image with the filtering performed by the image filtering, the decoded image being obtained by decoding an encoded image having been encoded by the encoding device. Thus, the encoding device according to the present invention has an effect similar to that of the image filter. Moreover, the encoding device with the above configuration can perform filtering more suitable for the respective target areas (filter target area T) by using (i) the components of the fixed filter coefficient vector (fixed coefficient vector calculated out from the fixed coefficient vector W), and (ii) the fixed coefficient. Thus, it is possible to perform the filtering by using a smaller number of components of the filter coefficient vector, compared with the case where the filter coefficient vector having different components for different target areas is used.

Moreover, by using the encoding device with the above configuration, it is possible to reduce the amount of encoding the filter coefficient vector, compared with the case where the filter coefficient vector having different components for different target areas is used.

(Application Example in which the Inter Predicted Image Generating Section)

Moreover, the adaptive filter 100 according to the present invention is applicable to the inter predicted image generating section 16 in the moving image encoding device 1.

Figure 7:
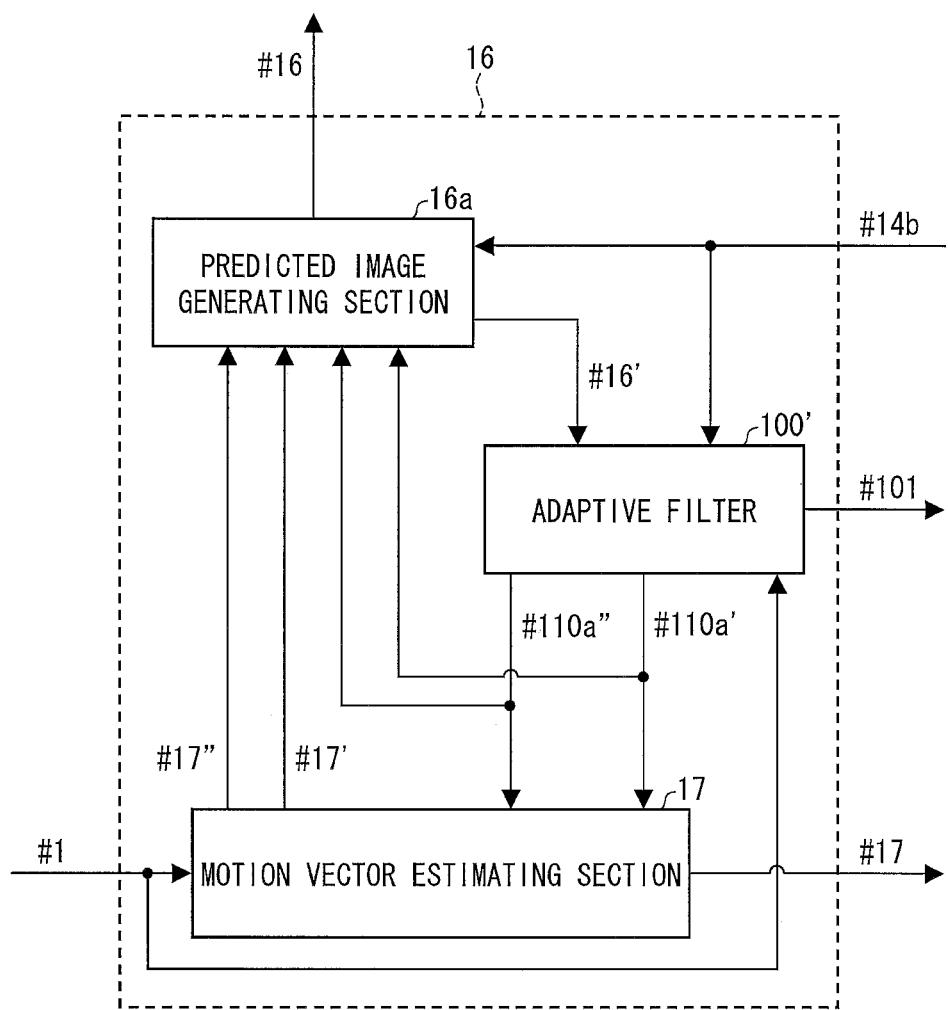
FIG. 7 is a block diagram illustrating an inter-prediction image generating section provided to the moving image encoding device according to the present embodiment, the inter-prediction image generating section being provided with the adaptive filter according to the embodiment.

FIG. 7 is a block diagram illustrating a configuration of the inter predicted image generating section 16 provided with the adaptive filer 100. In the following, the adaptive filter 100 in the present application example may be referred to as an adaptive filter 100'.

As illustrated in FIG. 7, the inter predicted image generating section 16 includes a predicted image generating section 16*a*, a motion vector estimating section 17, and an adaptive filter 100'. In the present application example, the adaptive filter 100' corresponds to AIF (Adaptive Interpolation Filter) in KTA, substantially.

In the following, operations of sections in the inter predicted image generating section 16 are described below.

(Step 101)

The reference image #14*b* stored in the buffer memory 14 is supplied to the adaptive filter 100'. In the following, the reference signal #14*b* is referred to as first reference signal #14*b*.

The adaptive filter 100' performs filtering to the first reference image #14*b* on the basis of a predetermined filter coefficient, thereby outputting first output image data #110*a*. That is, the adaptive filter 100' in this step operates as a fixed filter for filtering based on the predetermined filter coefficient.

Here, the predetermined filter coefficient may be, for example, a filter coefficient used in H.264/AVC. Moreover, due to the filtering performed by the adaptive filter 100', an image signal whose pixel precision is not more than integer pixels is generated, by interpolation, from the pixel values of the integer pixels contained in the first reference image #14*b*. This corresponds to a case where x' and y' in Equation (1) are numbers other than integers. Therefore, the first output image data 100 is image data including (i) the pixel values of the integer pixels and (ii) an interpolation signal whose pixel precision is not more than integer pixels.

(Step 102)

The motion vector estimating section 17 generates the first motion vector #17' on the basis of the first output image data #110*a*' and the input image #1. The first motion vector #17' is prepared for 1 slice or for 1 frame.

(Step 103)

The adaptive filter 100' determines a filter coefficient by processing the first reference image #14*b* with the process described in <Examples of Filtering Performed by Adaptive Filter 100>. The image generated by filtering performed by the adaptive filter 100' is referred to as second output image data #110A". Here, the first reference image #14*b* corresponds to the image data #100 above, and the second output image data 110*a*" corresponds to the output image data #110*a* above. Moreover, the input image #1 is supplied to the adaptive filter 100' as the teacher data #220.

The adaptive filter 100' generates an image signal whose pixel precision is not more than integer pixel, by interpolation, from the pixel values of the integer pixels contained in the first reference image #14*b*. This corresponds to a case where x' and y' in Equation (1) are numbers other than integers. Therefore, the second output image data 110*a*' is image data including (i) the pixel values of the integer pixel and (ii) an interpolation signal whose pixel precision is not more than integer pixel.

(Step 104)

The motion vector estimating section 17 generates the second motion vector #17" on the basis of the second output image data #110*a*", and the input image #1.

(Step 105)

The adaptive filter 100' performs filtering to the first reference image #14*b* by using the filter coefficient thus obtained, thereby generating a motion compensated image based on the second motion vector #17" so as to generate and output the inter predicted image #16.

The adaptive filter 100' may be configured to generate the second output image data #110a' by using control variables and filter bases, which are set according to the locations of the pixels in the output image data #110a'.

(Application Example to Moving Image Decoding Device)

In the following, the moving image decoding device 2 provided with the adaptive filter 100 is described, referring to FIG. 8.

The moving image decoding device 2 a moving image decoding device in part of which the H.264/AV standard and a technique adopted in the KTA software are used.

Figure 8:
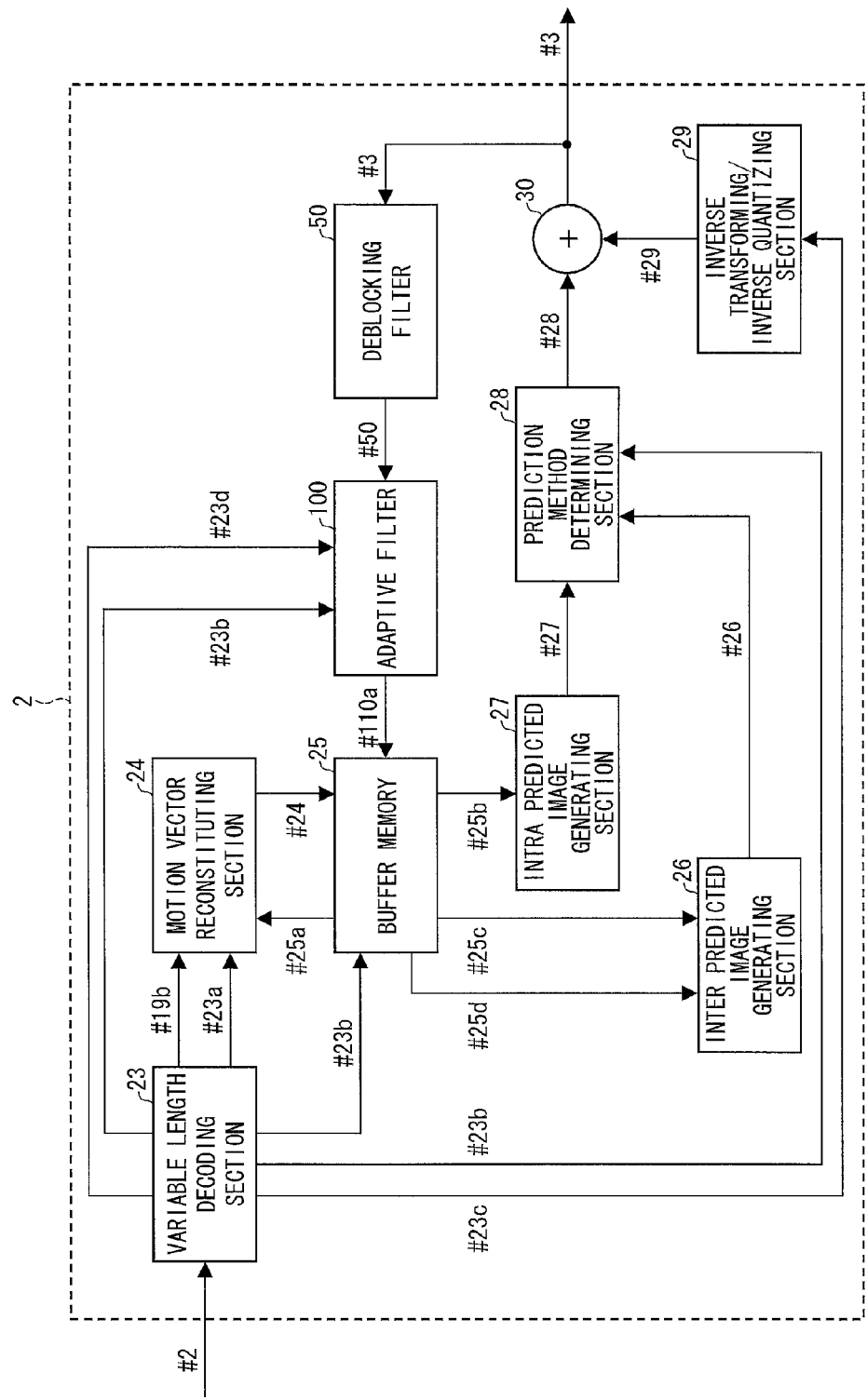
FIG. 8 is a block diagram illustrating a moving image decoding device provided with the adaptive filter according to the embodiment.

FIG. 8 is a block diagram illustrating a configuration of the moving image decoding device 2.

As illustrated in FIG. 8, the moving image decoding device 2 includes a variable length decoding section 23, a motion vector reconstituting section 24, a buffer memory 25, an inter predicted image generating section 26, an intra predicted image generating section 27, a prediction method determining section 28, an inverse quantizing/inverse transforming section 29, an adder 30, a deblocking filter 50, and the adaptive filter 100.

The moving image decoding device 2 receives an encoded data #2 and outputs an output image #3.

The variable length decoding section 23 performs variable length decoding of the encoded data #2, and outputs a differential motion vector #23a, side information #23b, a quantized prediction residual data #23c, and filter coefficient information #23d.

The motion vector reconstituting section 24 reconstitutes a motion vector #24 of a target partition from the differential motion vector #23a and the motion vector 25a, which have been decoded and stored in the buffer memory 25.

The buffer memory 25 stores therein the output image data #110a outputted from the adaptive filter 100, the motion vector #24, and the side information #23b.

The inter predicted image generated section 26 generates an inter predicted image #26 on the basis of (i) the motion vector #24, which has been decoded by the motion vector reconstituting section 24 and supplied thereto via the buffer memory 25, and (ii) the reference image #25d stored in the buffer memory 25. Note that, a motion vector #25c includes a motion vector identical with the motion vector #24. Moreover, the reference image #25d corresponds to the later-described output image data #110a outputted from the adaptive filter 100.

The intra predicted image generating section 27 generates an intra predicted image #27 from a local decoded image #25b in the same image as the target macro block, the intra predicted image #27 being stored in the buffer memory 25.

Based on prediction mode information contained in the side information #23b, the prediction method determining section 28 selects and outputs, as a predicted image #28, one of the intra predicted image #27 and the inter predicted image #26.

The inverse quantizing/inverse transforming section 29 performs inverse quantization and inverse DCT transformation to the quantized prediction residual data #23c, thereby outputting prediction residual #29.

The adder 30 adds the prediction residual #29 and the predicted image #28, and outputs the resultant image as the decoded image #3. Moreover, the decoded image #3 thus outputted is supplied to the deblocking filter 50.

The deblocking filter 50 performs deblocking process to a block border or a macro block border in the decoded image #3, if a difference between pixels adjacent with each other across the block border or the macro block border in the decoded image #3 is smaller than a predetermined threshold. The image data having been subjected to the deblocking process is outputted as deblocked image #50.

The adaptive filter 100 subjects the deblocked image #50 to the filtering described in <Examples of Filtering Performed by the Adaptive Filter 100>. Here, the deblocked image #50 corresponds to the image data #100 described above.

Moreover, the adaptive filter 100 in the present application example calculates out the filter coefficient on the basis of the filter coefficient information #23d decoded from the encoded data #2, and performs the filtering by using the filter coefficient thus calculated out.

That is, the adaptive filter 100 in the present application example is configured such that the adaptive filter 100 calculates out the filter coefficient based on the filter coefficient information #23d decoded from the encoded data #2, rather than determining the filter coefficient by the statistical approach as described in <Examples of Filtering Performed by the Adaptive Filter 100>, and the adaptive filter 100 performs the filtering by using the filter coefficient thus calculated out. The switching-over of the filter coefficient in the adaptive filter 100 has been described in <Examples of Filtering Performed by the Adaptive Filter 100>

The adaptive filter 100 outputs to the buffer memory 25 the output image data #110a thus generated by filtering the deblocking image #50.

The adaptive filter 100 receives the side information #23b. The side information #23b includes (i) information regarding whether the target block is double direction predicted block or single direction predicted block, (ii) information regarding whether the skip mode is applied to the target macro block or not, (iii) prediction mode information regarding whether the target macro block is intra predicted macro block or inter predicted macro block, and (iv) quantized parameter QP associated with the target block. Moreover, the side information #23b corresponds to the side information #100a described above.

The adaptive filter 100 in the present application example corresponds to ALF (Adaptive Loop Filter) in KTA, substantially. That is, the adaptive filter 100 in the application example receives and outputs pixels values of integer pixels. This corresponds to cases where x, y, x' and y' in Equation (1) are all integers.

The moving image decoding device 2 may be provided with no deblocking filter 50. In this case, the adaptive filter 100 performs the filtering directly to the decoded image #3, rather than the deblocked image #50. This configuration can reduce the throughput, as in the case of the moving image encoding device 1.

Like the moving image encoding device 1, the moving image decoding device 2 may be configured to include (i) both of the deblocking filter and the adaptive filter, (ii) only the adaptive filter, but not the deblocking filter, or (iii) the adaptive filter serving as a deblocking filter, and the adaptive filter.

<Decoding and Derivation of Filter Coefficient>

<Example Typically Exemplified in (a) of FIG. 6>

In case where the fixed filter parameter or its predictive differential data has been encoded, the variable length decoding section 23 decodes a fixed filer parameter as the filter coefficient information #23d. In (a) of FIG. 6, w(1) to w(M×N+1) and a_skip are decoded.

The adaptive filter 100 receives the fixed filter parameter and the control variable into the filter calculating function F whose general forms are shown in Equations 8 and 9, and derives the filter coefficient. In this example, adaptive filter 100 receives w(1) to w(M×N+1) and a_skip decoded in Equation (6) are inputted, and derives the filter coefficient vector V.

<Example Typically Exemplified in (b) of FIG. 6>

In case where the filter coefficient or the predictive differential data has been encoded, the variable length decoding section 23 decodes the filter coefficient as the filter coefficient information #23d. In the example in (b) of FIG. 6, one filter coefficient is encode for the component in variable according to the control variable, whereas a plurality of filter coefficients are encoded for respective values of the control variable for the components variable according to the control variable. The variable length decoding section 23 can derive a filter coefficient by branching the process depending on whether the coefficient is variable or invariable according to the control variable. In the example in (b) of FIG. 6, v(i), where i=1, 2, 3, 7, 8, 9, and 10 are decoded as the elements invariable according to the control variable among the elements of filter coefficient vector. Next, the filter coefficient v(i) where i=4, 5, and 6 for the case where the control variable v_skip=0 and the filter coefficient v(i) where i=4, 5, 6, are decoded as the elements variable according to the control variable among the elements of filter coefficient vector. Further, it is assumed that v(i)=v(i) for the elements invariable according to the control variable among the elements of filter coefficient vector.

<Example Typically Exemplified in (c) of FIG. 6>

Here, a basic filter coefficient and a difference from the basis filter coefficient, or a predictive differential data is encoded. The variable length decoding section 23 decodes the basic filter coefficient as the filter coefficient information #23d, then decodes a difference from the basic filter coefficient. In the example in (c) of FIG. 6, v(i) where i=1 to 10 is decoded as the basis filter coefficient. These become the filter coefficient vector V for the case where the control variable v_skip=0. Next, for the elements variable according to the control variable among the elements of filter coefficient vector, dV(i) where i=4, 5, 6, which is a difference from a basic difference, is decoded. For the component invariable according to the control variable, the filter coefficient v(i) for the case where the control variable v_skip=1 is derived from the following by using the basing filter coefficient v(i).

$$v'(i)=v(i), \text{ where } i=1,2,3,7,8,9,10$$

For the component variable according to the control variable, the filter coefficient v'(i) for the case where the control variable v_skip=1 is derived from the following by using the basis filter coefficient v(i) and the difference dV(i) from the basic filter coefficient.

$$v'(i)=v(i)+dV(i), \text{ where } i=4,5,6$$

As described above, the filter coefficient can be derived by branching for every component depending on whether or not being variable to the control variable.

<Operation of Adaptive Filter 100>

Again in the moving image decoding device 2, the adaptive filter 100 performs the operation as described above referring to FIGS. 3 and 4. In case where the filter coefficient vector is derived by branching, the process is carried out as shown in the flow of FIG. 3. In case where the filter coefficient vector is derived by summation such as Equation (9), the process is carried out as shown in the flow of FIG. 4. In case where the filter coefficient vector is derived by summation, the process may be carried out as shown in the flow of FIG. 3, by using the preliminary step, or the process may be carried out by referring to a table specified according to positions of the components of the filter coefficient and the values of the control variable are specified.

<Decoding by Using Predicted Value>

In the above explanation, the filter coefficient, the difference of the filter coefficient, or a degree of increase in the filter coefficient are decoded as the filter coefficient information #23d to be decoded. The present invention may be configured such that predicted value of the filter coefficient, the difference of the filter coefficient, or a degree of increase in the filter coefficient is derived and a difference from the predicted value is decoded.

As described above, a decoding device (moving image decoding device 2) according to the present invention comprises the image filter (adaptive filter 100) and causes the image filter to process the decoded image.

The decoding device according to the present invention with the above configuration can attain the same effect as the image filter. Moreover, the decoding device with the above configuration can perform filtering more suitable for the respective target areas (filter target area T) by using (i) the components of the fixed filter coefficient vector (fixed coefficient vector calculated out from the fixed coefficient vector W), and (ii) the fixed coefficient. Thus, it is possible to perform the filtering by using a smaller number of components of the filter coefficient vector, compared with the case where the filter coefficient vector having different components for different target areas is used.

Moreover, by using the decoding device with the above configuration, it is possible to reduce the amount of encoding the filter coefficient vector, compared with the case where the filter coefficient vector having different components for different target areas is used.

(Application Example for Application to Inter Predicted Image Generating Section)

Moreover, the adaptive filter 100 according to the present invention is applicable to the inter predicted image generating section 26 in the moving image decoding device 2.

Figure 9:
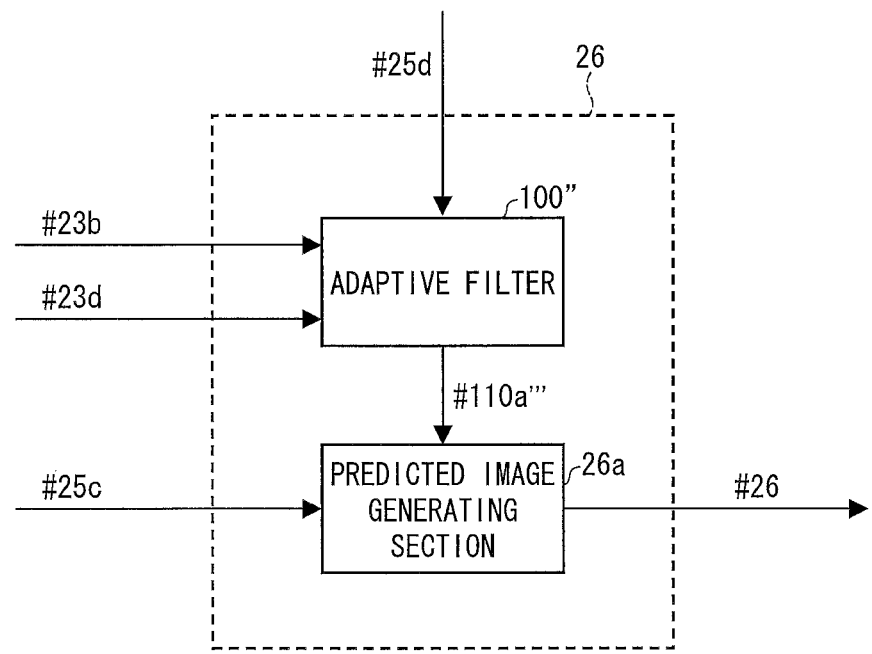
FIG. 9 is a block diagram illustrating an inter-prediction image generating section provided to the moving image decoding device according to the present embodiment, the inter-prediction image generating section being provided with the adaptive filter according to the embodiment.

FIG. 9 is a block diagram illustrating a configuration of the inter predicted image generating section 26 provided with the adaptive filter 100. In the following, the adaptive filter 100 in the present application example is referred to as an adaptive filter 100.

As illustrated in FIG. 9, the inter predicted image generating section 26 includes a predicted image generating section 26a and the adaptive filter 100".

In the following operations of sections of the inter predicted image generating section 26 is described.

The adaptive filter 100" performs filtering to the reference image #25d stored in the buffer memory 25. Here, the reference image #25d corresponds to the image data #100 described above.

In the adaptive filter 100" in the application example performs filtering based on the filter coefficient information #23d decoded from the encoded data #2.

That is, the adaptive filter 100" in the present application example is configured such that the adaptive filter 100" performs the filtering based on the filter coefficient information #23d decoded from the encoded data #2, rather than determining the filter coefficient by the statistical approach as described in <Examples of Filtering Performed by the Adaptive Filter 100>, and the adaptive filter 100 performs the filtering by using the filter coefficient thus calculated out. The switching-over of the filter coefficient in the adaptive filter 100 has been described in <Examples of Filtering Performed by the Adaptive Filter 100>

The adaptive filter 100" outputs, to the predicted image generating section 26a, the output image data #110a" thus generated by the filtering the reference image #25d.

Moreover, the adaptive filter 100" receives the side information #23b. The side information #23b includes (i) information regarding whether the target block is double direction predicted block or single direction predicted block, (ii) information regarding whether the skip mode is applied to the target macro block or not, (iii) prediction mode information regarding whether the target macro block is intra predicted macro block or inter predicted macro block, and (iv) quantized parameter QP associated with the target block. Moreover, the side information #23b corresponds to the side information #100a described above.

The adaptive filter 100" in the application example corresponds to the AIF (Adaptive Interpolation Filter) in KTA, substantially. That is, the adaptive filter 100" in the application example receives pixel values of integer pixels and outputs pixels values whose pixel precision is not more than the integer pixel. This corresponds to cases where x and y in Equation (1) are integer, and x' and y' in Equation (1) are an integer or a decimal.

The predicted image generating section 26a performs motion compensation to the output image data #110a'" by using the motion vector #25c, thereby generating and outputting the inter predicted image #26.

(Configuration of Encoded Data #2)

In the following, a configuration of the encoded data #2 generated by using the moving image encoding device 1 is described, referring to FIGS. 10 and 11.

Figure 10:
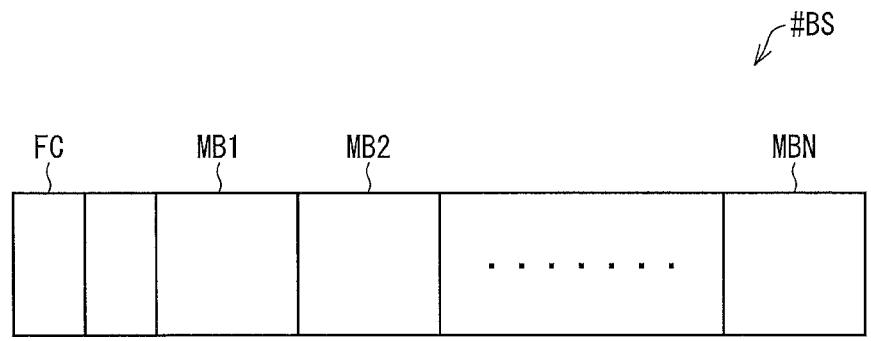
FIG. 10 is a view illustrating a bit stream of encoded data generated by the moving image encoding device according to the embodiment, so as to be inputted to the moving image decoding device according to the embodiment.

FIG. 10 is a view illustrating a bit stream #BS, which is generated for every slice of the encoded data #2 by the moving image encoding device 1 so as to be referred to for the slice of the encoded data #2 by the moving image decoding device 2. As illustrated in FIG. 10, the bit stream #BS contains filter coefficient information FC, and macro block information MB1 to MBN.

FIG. 11 is a view illustrating one example of the filter coefficient information FC.

The filter coefficient information FC is information including the filter coefficient information #23d generated by the adaptive filter 100, like the filter coefficient information #101 described above referring to FIG. 6. Note that the moving image decoding device 2 may be configured to decode information indicating which kind of control variable the control variable to use is, in addition to the filter coefficient information #23d. For example, 8-bit information from 0 to 255 is decoded, and the kind of the control variable to use is judged according to the bit number, for instance, 1 bit indicates the degree of flatness as a control variable, 2 bits indicate the edge angle as a control variable, 4 bits indicate the luminance as a control variable, 8 bits indicate color as a control variable, 16 bits indicate, as a control variable, whether an edge is included or not, 32 bits indicate the prediction direction as a control variable, 64 bits indicate, as a control variable, whether or not skip mode is applied, and 128 bits indicate, as a control variable, whether the inter or intra is used. Note that it is possible to select a plurality of control variables in free combinations by encoding such encoded data. The optional control variables may be these described in the present Specification, or those not described herein.

Moreover, the kind of the base to use for the control variable may be decoded. For example, 8-bit information from 0 to 255 is decoded, and the kind of the base to use is judged according to the bit number, for instance, 1 bit indicates the horizontal edge-stress base as a control variable, 2 bits indicate the vertical edge-stress base as a control variable, 4 bits indicate the standard Laplacian base as a control variable, 8 bits indicate first diagonal direction Laplacian base as a control variable, 16 bits indicate the second diagonal Laplacian base as a control variable, 32 bits indicate the DC offset base as a control variable, . . . . Moreover, the moving image decoding device 2 can select the kinds of the bases to use for individual control variables by decoding the kind of the based for every control variable. In FIG. 11, an example in which bases are designated for respective two control variables #1 and #2. The optional bases may be these described in the present Specification, or those not described herein.

Moreover, the moving image decoding device 2 may be configured to decode the information as to the number of tapping in the filter, for example, the decoding may be such that 0 is decoded for 3×3 filter, 1 is decoded for 5×5 filter, 2 is decoded for 7×7 filter, and 3 is decoded for 9×9 filter. In this way, it is possible to change the number of the filter coefficient vectors according to the filter effect, thereby improving encoding efficiency. The moving image decoding device 2 may or may not be configured to change the number of tapping in the base according the number of tapping in the decoded filter. Therefore, there may be such a case that the number of tapping in the filter is 5×5 while that of the base is 3×3. If the number of tapping in the filter is grater than that of the base, the value of the filter coefficient information #23d for a position out of the range of the base is decoded as the value of the filter coefficient vector. In this case, the value of the filter coefficient information #23d for a position out of the range of the base is a component invariable according to the control variable. Moreover, if the number of tapping in the filter is smaller than that of the base, the value of the filter coefficient vector is a component variable according to the control variable and can be defined even out of the range of the tapping in the filter, but the filtering is carried out only with filter coefficients as many as the number of taps in the filter.

Moreover, the moving image decoding device 2 may be configured to decode information indicating the format of the encoded data of the filter. For example, it may be such that 0 is decoded for the format of (a) of FIG. 6, 1 is decoded for the format of (b) of FIG. 6, and 2 is decoded for the format of (c) of FIG. 6. Even in an encoding device having a difficulty in determining the filter coefficient information #23d in the format of (a) of FIG. 6 because of the algorithm for determining the filter coefficient vector, it is possible to improve the encoding efficiency by changing, depending on the control variable, the filter coefficient vector to used.

Moreover, the moving image decoding device 2 may be configured to decode information indicating bit depth of the filter coefficient information. For example, whether the bit number is 8, 10, or 12 bits is decoded. The bit depth is equivalent to roughness of the quantization of the filter coefficient information.

Even though it is not illustrated in FIG. 11, the moving image decoding device 2 may be configured to decode the range of the values of the control variable. For example, whether the range of the valuables of the control variable is 0 and 1, or 0, 1, and 2 is decoded. Moreover, information indicating the threshold value for use in determining the control variable from the image data #100 and the side information thereof may be decoded. For example, the threshold information for determining the value of the control variable from the luminance or the degree of flatness may be decoded. Moreover, filtering unit may be decoded. The filtering unit may be pixel, block, a group of block, or the other. Moreover, in case where an area not to be subjected to the filtering is included in the unit area to be subjected to the filtering, information for specifying whether there is a filtering area may be included.

These kinds of information are referred to as filter coefficient information controlling information.

The filter coefficient vector can be switched over to be optimal for sequence, picture, or slice by decoding the filter coefficient information controlling information such as control variable, base, the number of tapping, or the like as described above. This improves the encoding efficiency. Moreover, the filter coefficient vector can be switched over appropriately for computing power of the encoding device. This gives the encoding deice a greater degree of freedom. For example, if the capacity of the encoding device is large, the encoding efficiency can be increased by increasing the number of the control variables or the number of the bases. On the other hand, if the capacity of the encoding device is small, it may be possible to minimize the number of the control variables or the number of the bases, or not to use the control variable or the base. Moreover, it is possible to change the control variable or base to use, according to the software or hardware mounted on the encoding device. For example, if the encoding device is implemented with software or hardware capable of calculating the degree of flatness at high speed, the encoding device may be such that the degree of flatness is used as the control variable. Such degree of freedom is not beneficial to the encoding device, but also for the decoding device. That is, if it can be assumed that the decoding device is small in capacity, the encoding can be performed in such a way that the number of the control variables to use or the number of bases to use is minimized.

Moreover, information (filter coefficient information format controlling information) indicating which information is included as the filter coefficient information controlling information may be decoded. For example, it may be configured that the control variable information is included but the tap information is not included. Note that the filter coefficient information 4b, the filter coefficient information controlling information, and the filter coefficient information format controlling information may be encoded in different positions on the encoded data. For example, it may be such that the filter coefficient information controlling information is encoded in a slice header, the filter coefficient information format controlling information is encoded in a picture header, and the filter coefficient information format controlling information is encoded in a sequence header. Moreover, the encoding may be to create encoded data corresponding to a picture parameter set or a sequence parameter set in the H.254/AVC.

The macro block information MB1 to MBN are information regarding the macro blocks included in the slice in interest, and includes a prediction mode #18b of the macro block, and block dividing information, etc. Here, n is the number of the macro blocks included in the slice in interest.

As described above, the data structure of the encoded data according to the present invention is a data structure of an encoded data, which a decoding device refers to, the decoding device (i) including an image filter for calculating a pixel value of target pixel in an output image from a pixel value of each of a pixel or pixels belonging to a target area in an input image by using a filter coefficient vector, and (ii) causing the image filter to process a decoded image, the data structure comprising: a fixed coefficient, with which the decoding device multiplies a product of a predetermined fixed vector and a variable coefficient variable according to at least either where the target area is in the input image, or where the target pixel is in the output image; and components of a fixed filter coefficient vector to which the decoding device adds a product of the variable coefficient, the fixed vector, and the fixed coefficient, the fixed filter coefficient vector being predetermined for every unit area constituting the output image.

When the encoded data has the data structure configured as above, the decoding device for decoding an image based on the encoded data can perform filtering by using the components of the fixed coefficient vector, and the fixed coefficient contained in the encoded data, thereby performing filtering more appropriately adaptive for every target area by using a smaller number of filter coefficient, compared with the case where the encoded data contains different filter coefficients for the target area, respectively.

SUMMARY

As described above, an image filter according to the present invention is an image filter for calculating a pixel value of target pixel in an output image from a pixel value of each of a pixel or pixels belonging to a target area in an input image and from a filter coefficient vector, comprising: filter coefficient vector changing means for changing the filter coefficient vector according to at least either where the target area is in the input image, or where the target pixel is in the output image.

With this configuration, in which the filter coefficient vector changing means for changing the filter coefficient vector according to at least either where the target area is in the input image, or where the target pixel is in the output image is provided, it is possible to perform filtering more appropriately adaptive for every target area according to at least either where the target area is in the input image, or where the target pixel is in the output image.

Moreover, it is preferable in the image filter according to the present invention that the filter coefficient vector is dividable into a sum of (i) a fixed filter coefficient vector predetermined for every unit area constituting the output image, and (ii) a variable filter coefficient vector variable by the filter coefficient vector changing means according to at least either where the target area is in the input image, or where the target pixel is in the output image.

In this configuration, the filter coefficient vector is dividable into the sum of (i) the fixed filter coefficient vector predetermined for every unit area constituting the output image, and (ii) the variable filter coefficient vector, and the filter coefficient vector changing means can change the variable filter coefficient vector according to at least either where the target area is in the input image, or where the target pixel is in the output image.

Therefore, with this configuration, it is possible to further attain such an effect that filtering can be more appropriately adaptive for every target area (i.e., more suitably for image characteristics in the individual target areas) by using the filter coefficient predetermined per unit area.

In case where the present invention is applied to H.264, the unit area may be a slice, may be a macro block, or may be a block.

Moreover, the fixed filter coefficient vector and the variable filter vector may be defined to include an offset component.

Moreover, it is preferable in the image filter according to the present invention that the fixed filter coefficient vector is dividable into (i) a fixed coefficient vector predetermined for every unit area constituting the output image, and (ii) a base.

Moreover, it is preferable in the image filter according to the present invention that the variable filter coefficient vector is further dividable into (i) a fixed coefficient predetermined for every unit area constituting the output image, (ii) a variable coefficient variable by the filter coefficient vector changing means according to at least either where the target area is in the input image, or where the target pixel is in the output image, and (iii) a predetermined fixed vector.

In this configuration, the variable filter coefficient vector is further dividable into (i) a fixed coefficient predetermined for every unit area constituting the output image, (ii) a variable coefficient, and (iii) a predetermined fixed vector. Moreover, the filter coefficient vector changing means can change the variable filter coefficient vector according to at least either where the target area is in the input image, or where the target pixel is in the output image. Therefore, it is possible to further attain such an effect that filtering can be more appropriately adaptive for image characteristics in the individual target areas by using the filter coefficient predetermined per unit area.

With this configuration, the image filter is supplied with the fixed coefficient vector (or fixed filter coefficient vector) determined for every unit area constituting the output image, and the fixed coefficient. By this, it is possible to attain such additional effect that filtering of a desired type appropriate for every target area can be performed.

For example, assume that the number of the target area in the unit area is 10, the number of the components in the fixed coefficient vector (or fixed filter coefficient vector) is P, and the number of the fixed coefficient is 1. In this case, the above configuration makes it possible to perform filtering of desired types appropriate for 10 target areas individually by supplying the image filter with the P+1 number of coefficient data in total. On the other hand, if the fixed coefficient vectors are calculated out respectively for the 10 target areas, it becomes necessary to have the 10×P number of coefficient data. Therefore, the above configuration makes it possible to perform filtering of types more appropriate for every target area by using a smaller number of coefficient data, compared with the case the fixed coefficient vectors (or filter coefficient vectors) are calculated out for the target areas, respectively.

It is preferable in the image filter according to the present invention that the variable coefficient is changed according to a degree of flatness in an image in the target area by the filter coefficient vector changing means; and the fixed vector is a filter base having at least one of edge-stress effect and a blurring effect.

With this configuration, the fixed vector is a filter base having at least one of edge-stress effect and a blurring effect, and the filter coefficient vector changing means can change the variable coefficient according to a degree of flatness in an image in the target area, wherein the degree of flatness is varied according to the position of the target area. Therefore, with this configuration, in which at least one of the edge-stress effect or the blurring effect is changed according to the degree of flatness, it is possible to further attain such an effect that more appropriately adaptive filtering can be performed.

Moreover, the filter base having at least one of the edge-stress effect or the blurring effect can provide edge-burring effect instead of edge-stress effect, depending on whether the fixed coefficient is positive or negative (the same is true hereinafter). Therefore, with this configuration, it is possible to further attain such an effect that more appropriately adaptive filtering by changing the edge-blurring effect according to the degree of flatness in the image in the target area.

It is preferable in the image filter according to the present invention that the variable coefficient is changed according to an edge angle of an edge in an image in the target area by the filter coefficient vector changing means; and the fixed vector is a filter base having at least one of edge-stress effect and a blurring effect.

With this configuration, the fixed vector is a filter base having at least one of edge-stress effect and a blurring effect, and by the filter coefficient vector changing means can change the variable coefficient according to an edge angle of an edge in an image in the target area. Therefore, with this configuration, it is possible to further attain such an effect that more appropriately adaptive filtering by changing at least one of the edge-stress effect and the blurring effect by changing the variable coefficient according the edge angle of the edge in the image in the target area.

It is preferable in the image filter according to the present invention that the variable coefficient is changed according to luminance of an image in the target area by the filter coefficient vector changing means; and the fixed vector is a filter base having at least one of edge-stress effect and a blurring effect.

In this configuration, the fixed vector is a filter base having at least one of edge-stress effect and a blurring effect, and the filter coefficient vector changing means can change the variable coefficient according to luminance of an image in the target area, wherein the luminance is variable according to the position of the target area. Therefore, with this configuration, it is possible to further attain such an effect that more appropriately adaptive filtering by changing at least one of the edge-stress effect and the blurring effect according the edge angle of the edge in the image in the target area.

It is preferable in the image filter according to the present invention that the variable coefficient is changed according to a color of an image in the target area by the filter coefficient vector changing means; and the fixed vector is a filter base having at least one of edge-stress effect and a blurring effect.

In this configuration, the fixed vector is a filter base having at least one of edge-stress effect and a blurring effect, and the filter coefficient vector changing means can change the variable coefficient according to a color of an image in the target area. Therefore, with this configuration, it is possible to further attain such an effect that more appropriately adaptive filtering by changing at least one of the edge-stress effect and the blurring effect according to the color of the image in the target area.

It is preferable in the image filter according to the present invention that the variable coefficient is changed according to whether the target area contains a block border or not by the filter coefficient vector changing means; and the fixed vector is a filter base having at least one of edge-stress effect and a blurring effect.

In this configuration, the fixed vector is a filter base having at least one of edge-stress effect and a blurring effect, and the filter coefficient vector changing means can change the variable coefficient according to whether the target area contains a block border or not. Therefore, with this configuration, it is possible to further attain such an effect that more appropriately adaptive filtering by changing at least one of the edge-stress effect and the blurring effect according to whether the target area contains a block border or not.

It is preferable in the image filter according to the present invention that the variable coefficient is changed by the filter coefficient vector changing means according to whether the block containing the target area is a block subjected to unidirectional prediction or a block subjected to bidirectional prediction; and the fixed vector is a filter base having at least one of edge-stress effect and a blurring effect.

In this configuration, the fixed vector is a filter base having at least one of edge-stress effect and a blurring effect, and the filter coefficient vector changing means can change the variable coefficient according to whether the block containing the target area is a block subjected to unidirectional prediction or a block subjected to bidirectional prediction. Therefore, with this configuration, it is possible to further attain such an effect that more appropriately adaptive filtering by changing at least one of the edge-stress effect and the blurring effect according to whether the block containing the target area is a block subjected to unidirectional prediction or a block subjected to bidirectional prediction.

It is preferable in the image filter according to the present invention that the variable coefficient is changed by the filter coefficient vector changing means according to whether or not a block including the target area is a block to which a skip mode is applied; and the fixed vector is a filter base having at least one of edge-stress effect and a blurring effect.

In this configuration, the fixed vector is a filter base having at least one of edge-stress effect and a blurring effect, and the filter coefficient vector changing means can change the variable coefficient is changed according to whether or not a block including the target area is a block to which a skip mode is applied. Therefore, with this configuration, it is possible to further attain such an effect that more appropriately adaptive filtering by changing at least one of the edge-stress effect and the blurring effect according to whether or not a block including the target area is a block to which a skip mode is applied.

It is preferable in the image filter according to the present invention that the variable coefficient is changed by the filter coefficient vector changing means according to whether a block including the target area is an inter predicted block or an intra predicted block; and the fixed vector is a filter base having at least one of edge-stress effect and a blurring effect.

In this configuration, the fixed vector is a filter base having at least one of edge-stress effect and a blurring effect, and the filter coefficient vector changing means can change the variable coefficient according to whether a block including the target area is an inter predicted block or an intra predicted block. Therefore, with this configuration, it is possible to further attain such an effect that more appropriately adaptive filtering by changing at least one of the edge-stress effect and the blurring effect according to whether a block including the target area is an inter predicted block or an intra predicted block.

It is preferable in the image filter according to the present invention that components of the fixed filter coefficient vector, and the fixed coefficient are defined to minimize a difference between a certain image and the output image, where the input image is a decoded image obtained by encoding and decoding the certain image.

In this configuration, the components of the fixed filter coefficient vector, and the fixed coefficient are defined to minimize the difference between a certain image and the output image, where the input image is a decoded image obtained by encoding and decoding the certain image. Therefore, with this configuration, it is possible to further attain such an effect that the filtering can be performed by using a variable coefficient vector calculated out by using the components of the fixed filter coefficient vector, and the fixed coefficient, which have been thus optimized.

It is preferable in the image filter according to the present invention that the fixed filter coefficient vector and the variable filter coefficient vector are orthogonal to each other.

With this configuration, in which the fixed filter coefficient vector and the variable filter coefficient vector are orthogonal to each other, it is possible to reduce the degree of freedom in the fixed filter coefficient vector, compared with a case where the fixed filter coefficient vector and the variable filter coefficient vector are not orthogonal to each other. Therefore, this configuration makes it possible to perform filtering more appropriately adaptive for every target area by using a smaller number of filtering coefficient.

Moreover, it should be noted that the fixed filter coefficient vector and the variable filter coefficient vector may or may not be orthogonal to each other in the image filter according to the present invention.

A decoding device according to the present invention is configured to comprise the aforementioned image filter, and cause the image filter to process a decoded image.

The decoding device according to the present invention with this configuration can bring about the same effect as the image filter. Moreover, the decoding device with this configuration can perform filtering more appropriately adaptive for every target area by using the components of the fixed coefficient vector (or the fixed coefficient vector) predetermined per unit area, and the fixed coefficient predetermined per unit area. Therefore, the decoding device can obtain a filter coefficient vector by using a smaller number of coefficient data, compared with the case where a fixed coefficient vector (or a fixed coefficient vector) having different components for every target area.

Furthermore, by using the decoding device with this configuration, it is possible to reduce code quantity for encoding the coefficient data (filter coefficient vector), compared with the case where a fixed coefficient vector (or a fixed coefficient vector) having different components for every target area.

Moreover, an encoding device according to the present invention is configured to comprise the aforementioned image filter, and cause the image filter to process a decoded image.

The encoding device according to the present invention with this configuration can bring about the same effect as the image filter. Moreover, the encoding device with this configuration can perform filtering more appropriately adaptive for every target area by using the components of the fixed coefficient vector (or the fixed coefficient vector) predetermined per unit area, and the fixed coefficient predetermined per unit area. Therefore, the encoding device can obtain a filter coefficient vector by using a smaller number of coefficient data, compared with the case where a fixed coefficient vector (or a fixed coefficient vector) having different components for every target area.

Furthermore, by using the encoding device with this configuration, it is possible to reduce code quantity for encoding the coefficient data (filter coefficient vector), compared with the case where a fixed coefficient vector (or a fixed coefficient vector) having different components for every target area.

Moreover, a data structure according to the present invention is a data structure of an encoded data, which a decoding device refers to, the decoding device (i) including an image filter for calculating a pixel value of target pixel in an output image from a pixel value of each of a pixel or pixels belonging to a target area in an input image by using a filter coefficient vector, and (ii) causing the image filter to process a decoded image, the data structure comprising: a fixed coefficient, with which the decoding device multiplies a product of a predetermined fixed vector and a variable coefficient variable according to at least either where the target area is in the input image, or where the target pixel is in the output image; and components of a fixed filter coefficient vector to which the decoding device adds a product of the variable coefficient, the fixed vector, and the fixed coefficient, the fixed filter coefficient vector being predetermined for every unit area constituting the output image.

When the encoded data has the data structure configured as above, the decoding device for decoding an image based on the encoded data can perform filtering by using the components of the fixed coefficient vector, and the fixed coefficient contained in the encoded data, thereby performing filtering more appropriately adaptive for every target area by using a smaller number of filter coefficient, compared with the case where the encoded data contains different filter coefficients for the target area, respectively.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention is suitably applicable to an image filter for filtering image data. Moreover, the present invention is also suitably applicable to a broadcast receiving terminal configured to decode encoded image data, a HDD recorder configured to encode image data and record the encoded image data in a recording medium, and to decode image data recorded in a recording medium.

REFERENCE SIGNS LIST

100: Adaptive Filter (Image Filter)
110: Filter Section
120: Control Variable Determining Section (Filter Coefficient Vector Changing Means)
1: Moving Image Encoding Device (Encoding Device)
2: Moving Image Decoding Device (Decoding Device)
16, 26: Inter Predicted Image Generating Section
R: Filter Reference Area
T: Filter Target Area

The invention claimed is:
1. A method for decoding moving images, comprising:
   (a) performing a variable length decoding of the moving image, and outputting a quantized prediction residual data and filter coefficient information;
   (b) generating a predicted image based on an image stored in a buffer memory;
   (c) performing inversed quantization and inverse transformation to the quantized prediction residual data, and outputting prediction residual;
   (d) adding the predicted image and the prediction residual, and outputting a decoded image;
   (e) performing deblocking process to the decoded image, and outputting a deblocked image;
   (f) calculating a filter coefficient vector by adding a fixed filter coefficient vector and a variable filter coefficient vector, wherein the fixed filter coefficient vector is determined per an unit area constituting the deblocked image, and the variable filter coefficient vector is changed per an target area; and
   (g) performing filtering process to the deblocked image by using the filter coefficient vector and pixel values of pixels in the deblocked image.
2. The method of claim 1, wherein a calculation of the filter coefficient vector includes a product of a variable coefficient and a fixed vector, wherein the variable coefficient is changed per the target area and the fixed vector is predetermined.
3. The method of claim 2, wherein the fixed vector is changed based on the pixel values of the pixels belonging to the target area.

* * * * *